United States Patent
Wang et al.

(10) Patent No.: US 9,025,466 B2
(45) Date of Patent: May 5, 2015

(54) METHODS AND APPARATUS FOR FACILITATING CHANNEL ACCESS IN A COMMUNICATION SYSTEM

(75) Inventors: Ying Wang, Easton, PA (US); Sundar Subramanian, Somerville, NJ (US); Xinzhou Wu, Monmouth Junction, NJ (US); Junyi Li, Chester, NJ (US); Thomas J. Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 482 days.

(21) Appl. No.: 13/541,984

(22) Filed: Jul. 5, 2012

(65) Prior Publication Data

US 2013/0176856 A1 Jul. 11, 2013

Related U.S. Application Data

(60) Provisional application No. 61/505,465, filed on Jul. 7, 2011, provisional application No. 61/505,468, filed on Jul. 7, 2011.

(51) Int. Cl.
*H04Q 7/28* (2006.01)
*H04W 24/00* (2009.01)
*H04B 17/00* (2006.01)
(Continued)

(52) U.S. Cl.
CPC ............... *H04W 24/00* (2013.01); *H04B 17/00* (2013.01); *H04L 43/50* (2013.01); *H04J 3/14* (2013.01)

(58) Field of Classification Search
CPC ....... H04W 24/00; H04B 17/00; H04L 43/00; H04L 43/50; H04J 3/14
See application file for complete search history.

(56) References Cited

U.S. PATENT DOCUMENTS 7,266,085 B2 9/2007 Stine
7,274,708 B2 9/2007 Benveniste
(Continued)

FOREIGN PATENT DOCUMENTS

WO 2009074949 A2 6/2009
WO WO2011014231 A1 2/2011

OTHER PUBLICATIONS

Anonymous, "An Adaptive Back-Off Control Method for 802.11 Wireless LAN," Disclosure No. IPCOM000151224D, Apr. 21, 2007, 2 pages.
(Continued)

*Primary Examiner* — Hassan Phillips
*Assistant Examiner* — Prenell Jones
(74) *Attorney, Agent, or Firm* — James K. O'Hare

(57) ABSTRACT

A transmission initiation interval timing structure is used in combination with a lower layer timing structure, e.g., physical layer timing structure. A device selects a subset of packet transmission initiation intervals and then limits initiation of packet transmission to those intervals thereby reducing the potential for collisions. Packet transmission may occur outside the initiation interval in which the transmission is initiated. In some embodiments, packet transmission length is intentionally limited to sizes which can be transmitted in a fraction of the amount of time the physical layer allows a single device to continuously transmit, e.g., in an amount of time which is equal to or less than the duration of a packet transmission initiation interval. This increases the probability that multiple devices will be able to successfully transmit small packets at short intervals on a regular basis even when carrier sensing techniques are used.

20 Claims, 11 Drawing Sheets

(51) Int. Cl.
  *H04L 12/26* (2006.01)
  *H04J 3/14* (2006.01)

(56) References Cited

U.S. PATENT DOCUMENTS

| | | | |
|---|---|---|---|
| 7,286,474 B2* | 10/2007 | Garg et al. | 370/230 |
| 7,664,031 B2 | 2/2010 | Davis | |
| 7,907,627 B2 | 3/2011 | Yang et al. | |
| 2004/0008627 A1* | 1/2004 | Garg et al. | 370/235 |
| 2004/0100936 A1* | 5/2004 | Liu et al. | 370/345 |
| 2009/0279427 A1* | 11/2009 | Ji et al. | 370/230 |
| 2009/0323716 A1 | 12/2009 | Chintalapudi et al. | |
| 2010/0157967 A1* | 6/2010 | Sakoda | 370/338 |
| 2010/0165963 A1 | 7/2010 | Chu et al. | |
| 2011/0110340 A1 | 5/2011 | Lakkis | |
| 2013/0010774 A1 | 1/2013 | Subramanian et al. | |
| 2013/0064236 A1* | 3/2013 | Ji et al. | 370/338 |
| 2013/0287043 A1 | 10/2013 | Nanda et al. | |

OTHER PUBLICATIONS

Siwamogsatham, "Improving CSMA for WLANs via Piggybacking and Scheduled Backoff Mechanisms," Future Generation Communication and Networking (FGCN 2007), Dec. 6-8, 2007, vol. 1, pp. 557-563.

Chang, Y., et al., "Goodput Enhancement of VANETs in Noisy CSMA/CA Channels", IEEE Journal on Selected Areas in Communications, Jan. 1, 2011, pp. 236-249, vol. 29, No. 1, IEEE Service Center, Piscataway, US, XP011340863, ISSN: 0733-8716, DOI: 10.1109/JSAC.2011.110122.

International Search Report and Written Opinion—PCT/US2012/045855—ISA/EPO—Oct. 19, 2012.

Kumar S. et al., "Medium Access Control protocols for ad hoc wireless networks: A survey", AD HOC Networks, May 1, 2006, pp. 326-358, vol. 4, No. 3, Elsevier, Amsterdam, NL, XP027982415, ISSN: 1570-8705 [retrieved on May 1, 2006].

Ma et al., "An Analysis of Generalized Slotted-Aloha Protocols" IEEE/ACM Transactions on Networking, vol. 17, No. 3, pp. 936-949 (Jun. 2009).

* cited by examiner

| FIGURE 9A | FIGURE 9B |

METHODS AND APPARATUS FOR FACILITATING CHANNEL ACCESS IN A COMMUNICATION SYSTEM

RELATED APPLICATIONS

The present application claims the benefit of the filing date of Provisional Patent Application Ser. No. 61/505,465, filed Jul. 7, 2011, titled "METHODS AND APPARATUS FOR FACILITATING CHANNEL ACCESS IN A COMMUNICATION SYSTEM" and claims the benefit of the filing date of Provisional Patent Application Ser. No. 61/505,468, filed Jul. 7, 2011, titled "SYNCHRONOUS TRANSMISSION METHODS AND APPARATUS" both of which are assigned to the assignee of the present application and both of which are hereby expressly incorporated by reference in their entirety.

FIELD

The present application relates to methods and apparatus for facilitating channel access in a communications system, e.g., in an ad hoc or other system, where periodic and/or semi-periodic transmissions may occur.

BACKGROUND

In various communications systems, carrier sensing alone or in combination with a randomized back-off transmission time technique is used, as a part of a process of determining when a device will transmit on a physical communications channel.

Consider, for example, 802.11 based systems. In a typical 802.11 based system, a broadcast packet is transmitted on a channel based on a DCF (distributed coordination function) mechanism. The system may include multiple nodes. Each node maintains a back-off counter used in determining when the node may transmit data within an overall time interval in which devices may transmit data signals to one another. The back-off counter is initialized to zero.

Each node that wishes to broadcast senses the channel and transmits if the channel is sensed to be idle for more than a duration known as DIFS (DCF Inter Frame Space) and the device's backoff counter is zero. After each transmission, the transmitting node picks a new back-off timer, e.g., using a pseudo random function to determine the backoff timer value. If the timer expires before the next packet arrives for transmission, the device can transmit after sensing the channel to be idle for a DIFS duration assuming the last transmission in the system was successful. If the last transmission in the system was unsuccessful, the device needs to wait for EIFS (Extended Inter Frame Space). Whether a DIFS or EIFS is to be used can be determined from whether an acknowledgment is detected following a transmission.

In the event that a packet is waiting for transmission and the backoff counter is zero, but the carrier sensing detects that the carrier is occupied, the device will pick a second backoff timer value and transmit at the expiration of the second back-off timer value. Decrementing of the backoff timer value is based on sensing that the channel is unoccupied for a period of time with the amount the backoff time is decremented being a function of the amount of time the channel remains unoccupied from the point in time the backoff value was selected.

Typical drawbacks with the carrier sensing and back off scheme are that all the waiting nodes with zero back-off counter try to transmit at the same time when the channel becomes idle. This can occur when two transmitters choose the same back-off. Even if all waiting nodes have non-zero random back-off, the probability that 2 transmitters transmit at the same time is high when the node density is high given that there is a limited number of back-off values that may be selected. Note that the spatial configuration of concurrent transmitters in most ad hoc systems are not controlled by any protocol, i.e., the locations of the colliding transmitters can be arbitrary. This further leads to poor performance in receiving the broadcasting messages, especially in a dense deployment.

Collisions can be particularly problematic in systems where it is desirable and/or important to send small amounts of data on a somewhat regular basis. Collisions and the corresponding possible loss of data or delays related to re-transmission can cause what are intended to be regular transmissions appearing irregular in terms of spacing and/or can reduce the ability of devices to communicate at relatively uniform time intervals in a reliable manner.

This can be of particular concern in systems such as motor vehicle and/or other control systems, where it is important to provide frequent and/or periodic or semi-periodic data transmissions, which may be relied upon to avoid vehicle collisions and/other types of accidents.

In view of the above discussion it should be appreciated that there is a need for improved methods of controlling when and/or how devices contend for transmission resources. It would be desirable that at least some methods and apparatus reduced the probability of collisions in systems which repeatedly transmit, e.g., broadcast, small amounts of data on a periodic or semi-periodic basis.

SUMMARY

Initiation of packet transmission is constrained in accordance with various features to control actual packet transmission in a manner that reduces contention and possible collisions. Many of the features of the present invention are particularly well suited for systems where periodic and/or semi-periodic transmissions are implemented by at least some devices in the system.

The transmission initiation features included in various embodiments can provide collision avoidance beyond that provided by lower layer resource contention mechanisms, e.g., 802.11 carrier sensing and/or transmission back-off timing mechanisms and can be implemented, at least in some embodiments, without requiring modifications to such mechanisms.

Thus, through higher level, e.g., application layer and/or MAC constraints, on packet transmission initiation, a conventional air interface can be used and controlled in a manner which reduces collisions and interference in applications where small packets, e.g., packets which can be transmitted in a fraction of the maximum permitted transmission time, are transmitted on a periodic or semi-periodic basis. In accordance with some but not necessarily all embodiments, an application layer with data to be transmitted restricts the time at which it will notify the lower level transmission system, e.g., an 802.11 or other system, that there is data to be transmitted. Thus, by implementing various constraints at the application or MAC layer, collision avoidance can be achieved or enhanced at the physical layer without having to make alterations to the physical layer transmission system.

In some embodiments an application corresponding to the application layer is implemented on a first processor. The application is subject to transmission initiation constraints and does not inform the physical transmitter, e.g., an 802.11 card or transmitter, that there is data to be transmitted except during transmission initiation intervals which may be selected by the device performing the transmission from a plurality of recurring transmission initiation intervals. The transmission initiation intervals used by different devices are synchronized in time. Thus, while different devices may select to use different transmission initiation intervals, the start of the intervals is synchronized in an overall common timing structure which is common to the different devices in the system.

Since devices select recurring initiation intervals to use in a manner which is desired to reduce the possibility of collisions, the number of collisions can be reduced by controlling initiation of data, e.g., packet transmission. The actual transmission time of a packet is determined, at least in some embodiments, by the physical layer, e.g., transmission system. Thus, while packet transmissions are likely to occur in the transmission initiation interval in which data corresponding to a packet is provided to the transmission system, the actual transmission may occur outside the transmission initiation interval in which the data is provided to the physical transmission device by the application and/or MAC layer to initiate transmission of a packet.

Examples of applications where the methods and apparatus of the present invention are particularly well suited are applications where mobile systems, e.g., automobiles, aircraft, etc., routinely broadcast device location updates so that other systems in the area can be aware of the device's position, speed, and/or direction of travel, etc, and adjust their own position, speed and/or direction of travel to maintain suitable device spacing requirements on a roadway or in the air.

By imposing packet transmission initiation constraints at the MAC and/or application layer, airlink resources are effectively divided, for at least some applications, into multiple distinct sets of resources with the physical or other lower level layer determining, e.g., through contention based resource mechanisms, which particular physical resource is used to transmit a packet.

In some but not necessarily all embodiments, an application is constrained from notifying the lower layer and/or physical device responsible for transmitting over the air, e.g., an 802.11 card of a laptop computer running an application or a wireless transmitter of a general purpose computer, that the application has data which is ready for transmission until an initiation interval corresponding to the device seeking to transmit.

Thus, a conventional standard compliant device, e.g., a device complying with one or more of the 802.11 standards, can be controlled in a manner that improves airlink contention for various applications, e.g., applications involving at least some periodic and/or semi-periodic transmissions.

In accordance with one feature, a set of recurring packet transmission initiation intervals is determined to correspond to a data transmission time period including multiple packet transmission opportunities. The actual time of a packet transmission may vary depending on airlink utilization by one or more devices, e.g., when another device ends a packet transmission. However, the transmission initiation intervals recur over time without regard to when actual packet transmissions occur. Thus, the packet transmission initiation intervals appear as a recurring set of time intervals which recur in a predictable manner.

As should be appreciated, while packet transmission may be initiated at a given point in time, the process of contending for transmission resource may result, e.g., due to use of the transmission resource and/or a back off timer, with the packet being transmitted at a later time. Thus, while there is a strong relationship between a packet transmission initiation time interval and the actual transmission time of a packet, there is no guarantee that a packet will actually be transmitted in the same time period as the packet initiation time period in which the packet transmission is initiated. However, this will often be the case and in some embodiments may be the case for all or the majority of packet transmissions.

The use of a transmission initiation interval timing structure in accordance with various features allows for additional constraints to be placed on packet transmission to reduce the potential for collisions than would occur without the use of the transmission initiation interval timing structure.

In accordance with one feature, a device selects a subset of packet transmission initiation intervals to be associated with and then limits initiation of packet transmission to those intervals. By selecting a subset of the packet initiation intervals, e.g., some fraction less than one of the possible packet initiation intervals in the recurring timing structure, potential for collisions is reduced as compared to systems where all devices are allowed to contend for resources during all time periods.

Furthermore, in some embodiments, packet transmission length is intentionally limited to sizes which can be transmitted in a fraction of the amount of time the physical layer allows a single device to continuously transmit, e.g., in an amount of time which is equal to or less than the duration of a packet transmission initiation interval. This increases the probability that multiple devices will be able to successfully transmit small packets at short intervals on a regular, e.g., periodic or semi-periodic basis.

To reduce the probability of collisions, in some embodiments a device monitors airlink resources for a period of time prior to selecting a subset of transmission initiation intervals. Received signal energy provides a reasonable indication of amount of airlink resource utilization during the monitoring period. In some embodiments, the selected subset of packet transmission initialization intervals is selected to include the one or a few of the airlink transmission initiation time periods corresponding to the time periods in which the least signal energy was detected.

The methods and apparatus of the present invention are particularly well suited for use by devices which frequently exchange small amounts of information, e.g., automobiles transmitting location, speed and/or other information on a regular basis. Since the methods and apparatus of the present invention do not require changes to the lower layer resource contention mechanisms, they do not interference with other devices, e.g., other 802.11 devices, using the same lower layer resource contention mechanisms to communicate information corresponding to other applications.

The methods and apparatus described herein are particularly well suited for applications where groups of devices in near proximity, e.g., on a highway or congested travel area, are likely to operate in the same manner thereby increasing the likelihood that subsets of devices will be competing for resources in different packet transmission initiation time periods.

An exemplary method of operating a communications device to transmit packets in accordance with one embodiment comprises: storing information defining a plurality of transmission initiation intervals, said transmission initiation intervals corresponding to a recurring broadcast interval including multiple packet transmission opportunities; monitoring for use of transmission resources during at least a portion of said recurring broadcast interval; selecting a subset of transmission initiation intervals corresponding to a portion of said recurring broadcast interval as a function of signals detected on said transmission resources during said monitoring; and restricting initiation of packet transmission to transmission initiation intervals associated with said communications device, initiation of packet transmission triggering an attempt to transmit a packet, said attempt to transmit including a channel sensing operation.

An exemplary communications device in accordance with one embodiment comprises: at least one processor configured to: store information defining a plurality of transmission initiation intervals, said transmission initiation intervals corresponding to a recurring broadcast interval including multiple packet transmission opportunities; monitor for use of transmission resources during at least a portion of said recurring broadcast interval; select a subset of transmission initiation intervals corresponding to a portion of said recurring broadcast interval as a function of signals detected on said transmission resources during said monitoring; and restrict initiation of packet transmission to transmission initiation intervals associated with said communications device, initiation of packet transmission triggering an attempt to transmit a packet, said attempt to transmit including a channel sensing operation. In some embodiments the communications device further includes a memory coupled to the at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

In various embodiments, a hierarchical synchronous periodic channel structure on a timeline, e.g., a recurring synchronized system timing structure, is imposed. In accordance with one aspect of some embodiments, the resources are divided into K sub-resources, e.g., this could be a sequence of time-slots or combination of time-slot/frequency band combinations) and each device chooses a preferred sub-resource in which the device will contend for the channel.

The choice of the preferred sub-resource could be, and in some embodiments is, made by observing the channel occupancies in the past, and identifying resources that are least in conflict. Such resources can be identified by means of the amount of energy observed in the resource over a period of time. As should be appreciated resources which are heavily used will normally tend to have higher energy detected on them than resources which are lightly used.

Within the resources available for communications, the nodes still contend for the resources using the applicable physical layer resource contention mechanism, e.g., using an 802.11p contention mechanism. Since the choice of sub-resources are made in a semi-static manner, e.g., with a node using the same set of resources over an extended period of time or until collisions render the resource unsatisfactory, the nodes that transmit tend to be spread apart in a uniform manner, e.g., in terms of time, frequency and/or space.

This approach has the benefit of reducing the concurrent channel access probability since individual nodes wait until their sub-resource's time, e.g., transmission initiation time interval, prior trying to initiate a data, e.g., packet, transmission. This facilitates the even spreading out of channel access times across the time intervals available for transmission.

Figure 1:
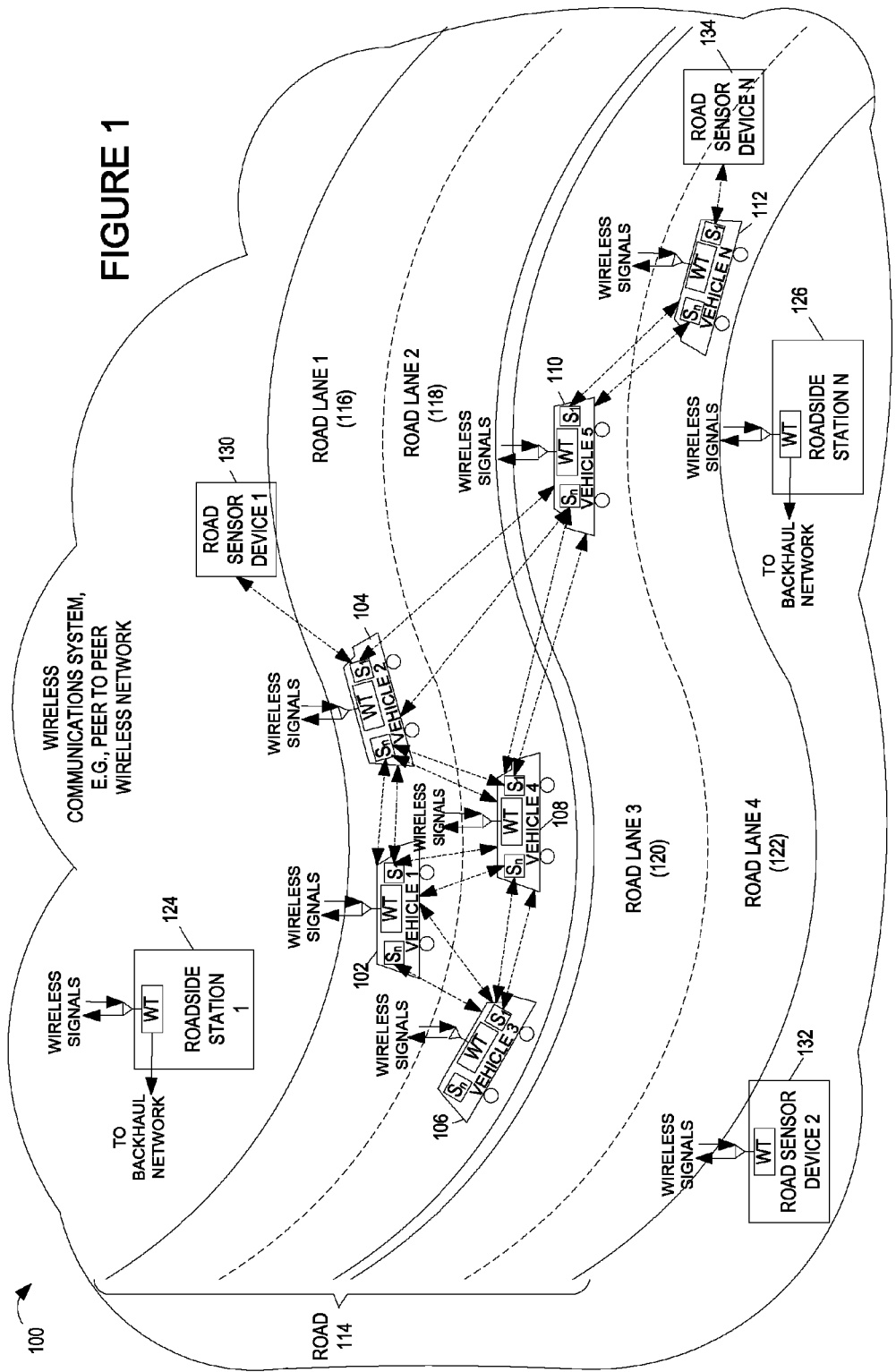
FIG. 1 is drawing of an exemplary wireless communications system, e.g., a peer to peer wireless network, in accordance with various embodiments.

FIG. 1 is drawing of an exemplary wireless communications system 100, e.g., a peer to peer wireless network, in accordance with various exemplary embodiments. The system 100 of FIG. 1 includes a plurality of vehicles (vehicle 1 102, vehicle 2 104, vehicle 3 106, vehicle 4 108, vehicle 5 110 . . . , vehicle N 112) located at different positions on a multi-lane road 114 which includes lane 1 116, lane 2 118, lane 3 120, and lane 4 122. Each vehicle (102, 104, 106, 108, 110, 112) includes a wireless terminal (WT) and a plurality of sensor modules (sensor $S_1$, . . . , sensor $S_n$). The system 100 of FIG. 1 also includes a plurlality of roadside stations (roadside station 1 124, . . . , roadside station N 126). Each roadside station includes a wireless terminal. The wireless terminals, which may be located in vehicles and located in roadside stations, communicate with one other via wireless signals, e.g., using a peer to peer signaling protocol, e.g., to exchange position and other sensor provided information. The wireless terminals in the roadside station, may be, and sometimes are coupled to a backhaul network.

The sensors, e.g., sensor modules, included in the vehicles 102, 104, 106, 108, 110, 112 include both passive and active sensor devices. The sensor modules include, e.g., GPS modules, acceleration measurement modules, velocity measurement modules, speed measurement modules, position measurement modules, radar modules, acoustic modules, visual light spectrum modules, e.g., a camera module, infrared modules, distance measurement modules, vehicle separation modules, braking distance modules, impact avoidance modules, cruise control modules, parking modules, lane positioning modules, traffic congestion determination modules, posted speed limit determination modules.

In the system 100 of FIG. 1, there are also a plurality of road sensor devices, e.g., road sensor device 1 130, road sensor device 2 132, . . . , road sensor device N 134. In some embodiments, at least some of the road sensor devices are embedded in the road. The road sensor devices include, e.g., location markers, lane demarcation markers, edge of road markers, posted speed limit communication devices, road condition sensors, e.g., road temperature sensor, wet road condition detection sensor, icy road condition sensor, etc. In some embodiments, for at least some road sensor devices, a sensor module in a vehicle communicates with a road sensor device which may be coupled to or included in a wireless terminal that is responsible for transmitting sensor data. Thus, in at least some embodiments, at least some road sensor devices include a wireless terminal which participates in the wireless communications, e.g., in the peer to peer communications allowing devices in the proximity of the sensor to receive sensor data, e.g., via a wireless interface that allows transmission of the data over the air.

Figure 2:
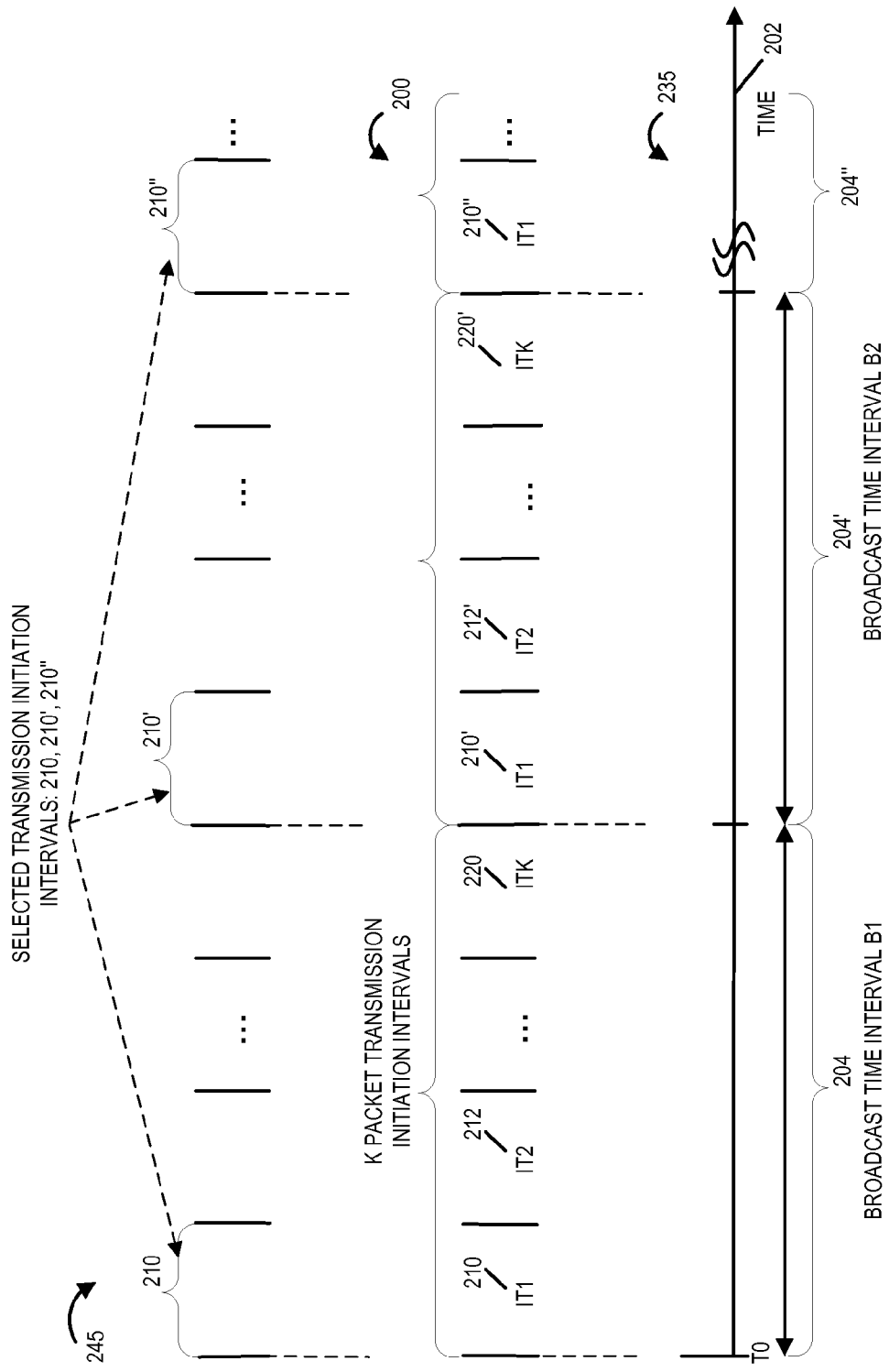
FIG. 2 illustrates an exemplary packet transmission initiation interval timing structure that is imposed on top of recurring broadcast intervals, in accordance with some embodiments.

FIGS. 2-5 show various exemplary timing diagrams in which time is represented by the horizontal axis. FIG. 2 includes drawings 200, 235 and 245. Drawing 200 illustrates an exemplary packet transmission initiation interval timing structure that is imposed on top of the recurring broadcast intervals, used by the physical layer, illustrated in drawing 235, in accordance with one aspect of various embodiments. The transmission initiation intervals and broadcast time intervals may be used in the system shown in FIG. 1 with the timing of the intervals being synchronized between devices in the exemplary communications system 100. For discussion purposes, consider that T0 indicates the beginning of the broadcast interval B1 204 in the recurring broadcast time intervals 204, 204', 204". The transmission initiation interval timing structure 200 in accordance with various features allows for additional constraints, e.g., application layer and/or MAC layer constraints, to be placed on packet transmission to reduce the potential for collisions without having to alter the timing structure used at the physical layer for transmission control and synchronization purposes. In fact, the physical layer, e.g., actual physical transmitter, need not be aware of the use of transmission initiation intervals or the constraints associated therewith which are used by the application and/or MAC layer.

The recurring broadcast intervals illustrated in drawing 235 repeat over a recurring broadcast time interval 204 with each subsequent occurrence being indicated by the use of a' following the reference number 204. Thus recurring broadcast intervals include a plurality of recurring broadcast time intervals, e.g., 204, 204', 204", each including one or more, e.g., a plurality, of packet transmission opportunities. In accordance with one aspect of some embodiments a broadcast channel is divided into a plurality of periodically repeating channel resources, e.g., K resources. In at least some embodiments the K resources are timeslots of a communications channel. In the FIG. 2 exemplary embodiment each broadcast interval, e.g., 204, 204', is logically divided into K periodically recurring time slots which are the packet transmission initiation intervals. Each of the K recurring transmission initiation intervals corresponds to at least one packet transmission opportunity for a device. As can be appreciated from FIG. 2 example, the K transmission initiation intervals IT1 210, IT2 212, . . . , ITk 220 correspond to the broadcast time interval 204, K transmission initiation intervals IT1 222, IT2 224, . . . , ITk 230 correspond to the broadcast time interval 204', and the K transmission initiation intervals correspond to the broadcast time interval 204" and so on.

In accordance with various embodiments a communications device that intends to transmit a packets over time, e.g., on a recurring or semi-periodic basis, selects one or more packet transmission initiation intervals during a broadcast interval to use to support the expected packet transmissions. The selection of a particular subset of transmission initiation intervals maybe, and in some embodiments is, based on a detected channel occupancy during one or more broadcast intervals during which monitoring is performed prior to the selection of the subset of broadcast intervals by the device.

As an example of an initiation interval selection, consider that the device selects to use the first packet transmission initiation of each broadcast time interval. In such a case, the initiation intervals which are used by the device will recur at a predictable uniform spacing which is well suited for periodic transmissions. Depending on the expected or desired time between transmissions, a device may select to use multiple transmission initiation intervals during each broadcast time interval, e.g., the first and third intervals.

In the FIG. 2 example, a device selects to use the first packet transmission interval in each broadcast interval. Thus, drawing 245 illustrates 3 selected packet transmission initiation intervals, e.g., packet transmission initiation intervals 210, 210', and 210".

In accordance with one feature of various embodiments, packet transmission initiation, e.g., the time at which data is provided to the transmission system for purposes of starting the process of packet transmission and/or channel access contention for purposes of transmitting a packet, is restricted by the application(s) and/or MAC functionality in a device to the selected subset of transmission initiation intervals, e.g., 210, 210', and 210".

It should be appreciated that while an application may be constrained in accordance with various features from providing data to the transmission system to start a packet transmission to the subset of transmission initiation intervals the device has selected to use, once provided with the data to be transmitted the physical layer of the transmitter will proceed with determining the actual transmission time of a packet of data based on its backoff counter and/or the carrier sensing techniques that it implements. In some but not necessarily all embodiments, 802.11p compliant carrier sensing and backoff techniques are used to determine the actual time at which a packet is transmitted during the broadcast time interval once the transmission system is made aware of the data waiting to be transmitted. Thus, while in most cases a packet will be transmitted during the transmission initiation interval in which its transmission is initiated it may end up being transmitted during a portion of the broadcast interval corresponding to a subsequent transmission initiation interval if the channel is occupied or a large backoff is selected.

Beacon signaling and/or other synchronization techniques may be used to achieve device synchronization allowing for the devices to operate in a time synchronized manner which is consistent with timing diagram shown in FIG. 2.

Figure 3:
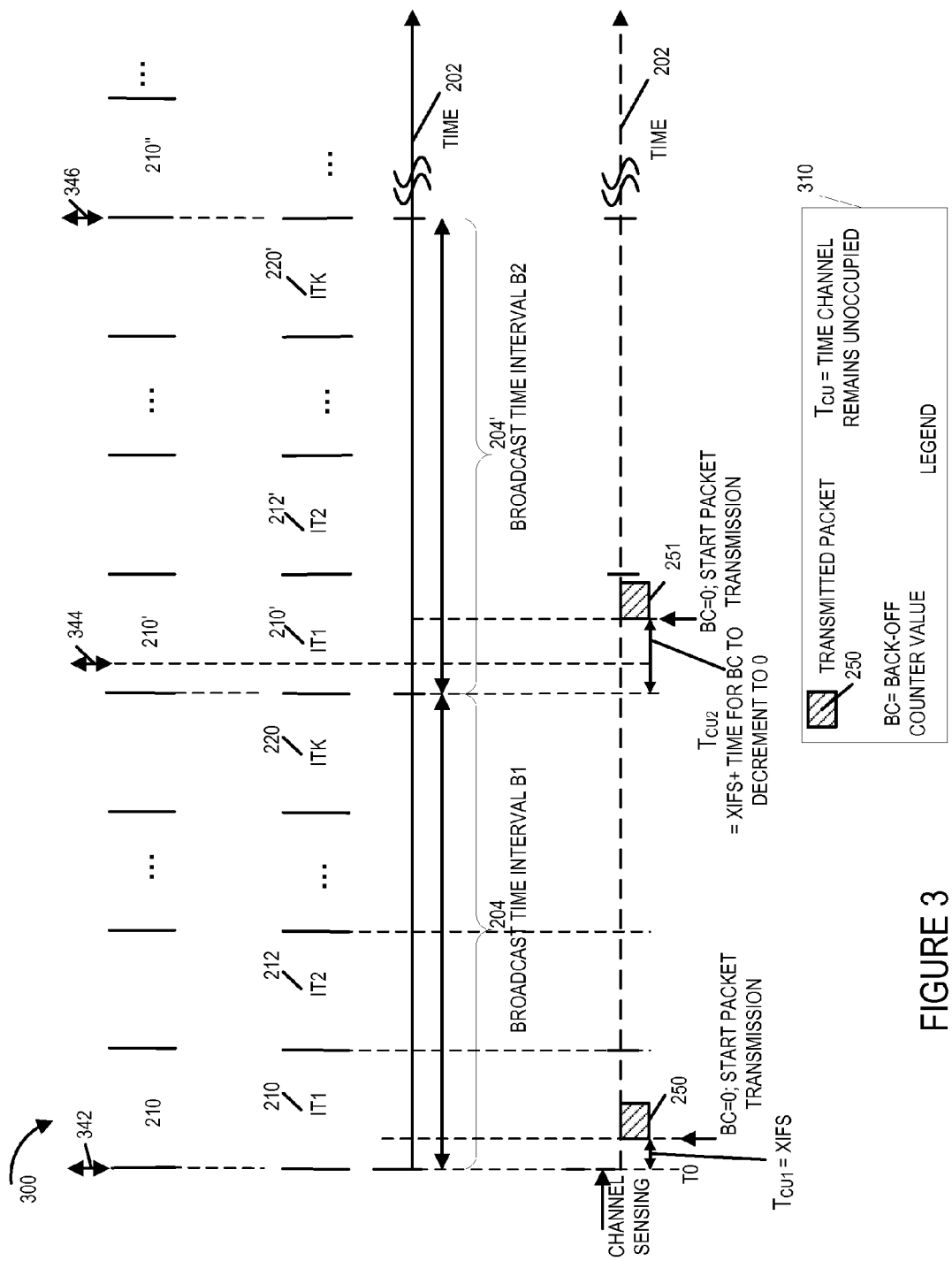
FIG. 3 illustrates an example showing packet transmission initiation in the selected transmission initiation intervals, back-off counter value decrement process and actual packet transmission operation in accordance with an exemplary embodiment.
Figure 4:
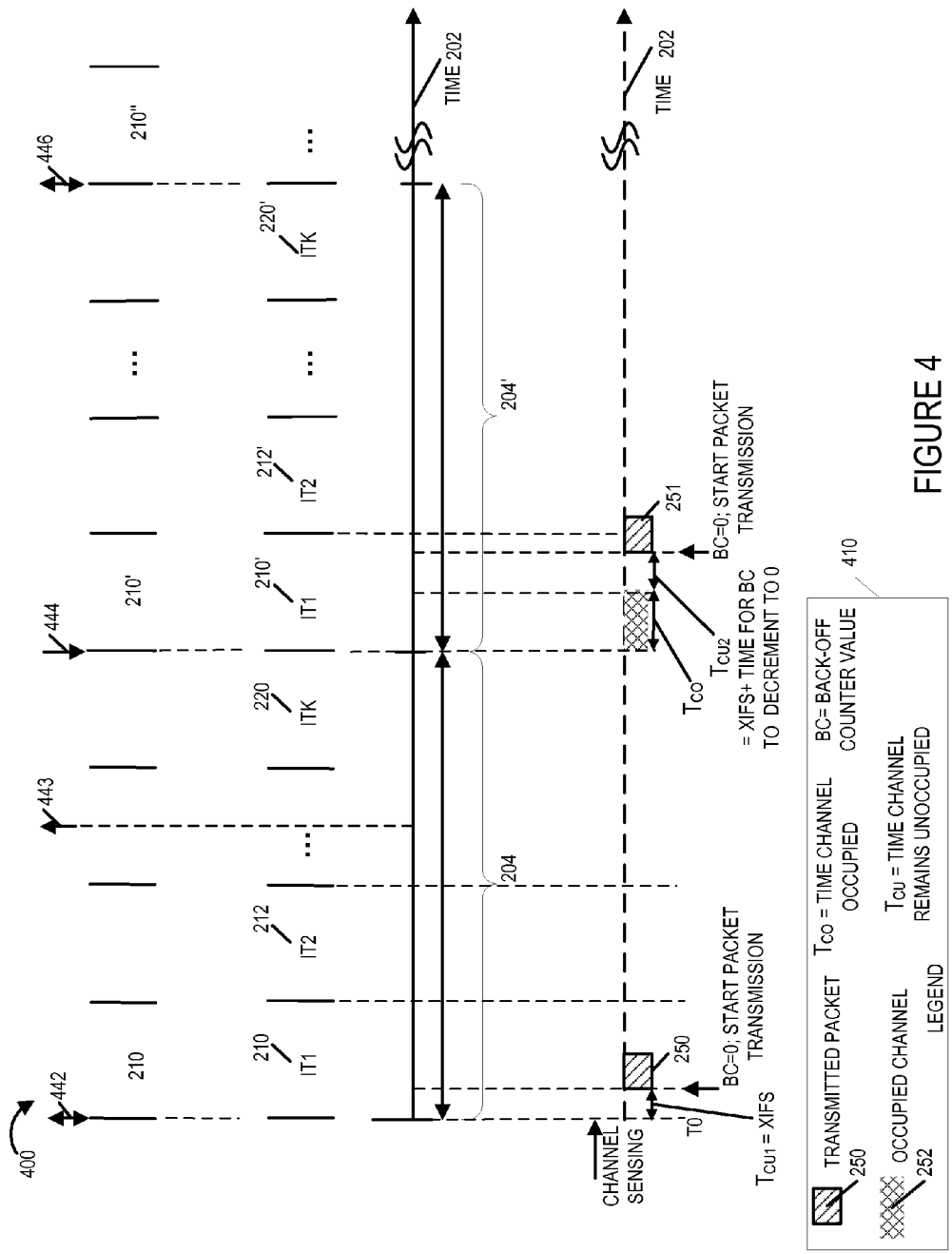
FIG. 4 illustrates another example showing packet transmission initiation in the selected transmission initiation intervals, back-off counter value decrement process and actual packet transmission of a packet in accordance with another exemplary embodiment.
Figure 5:
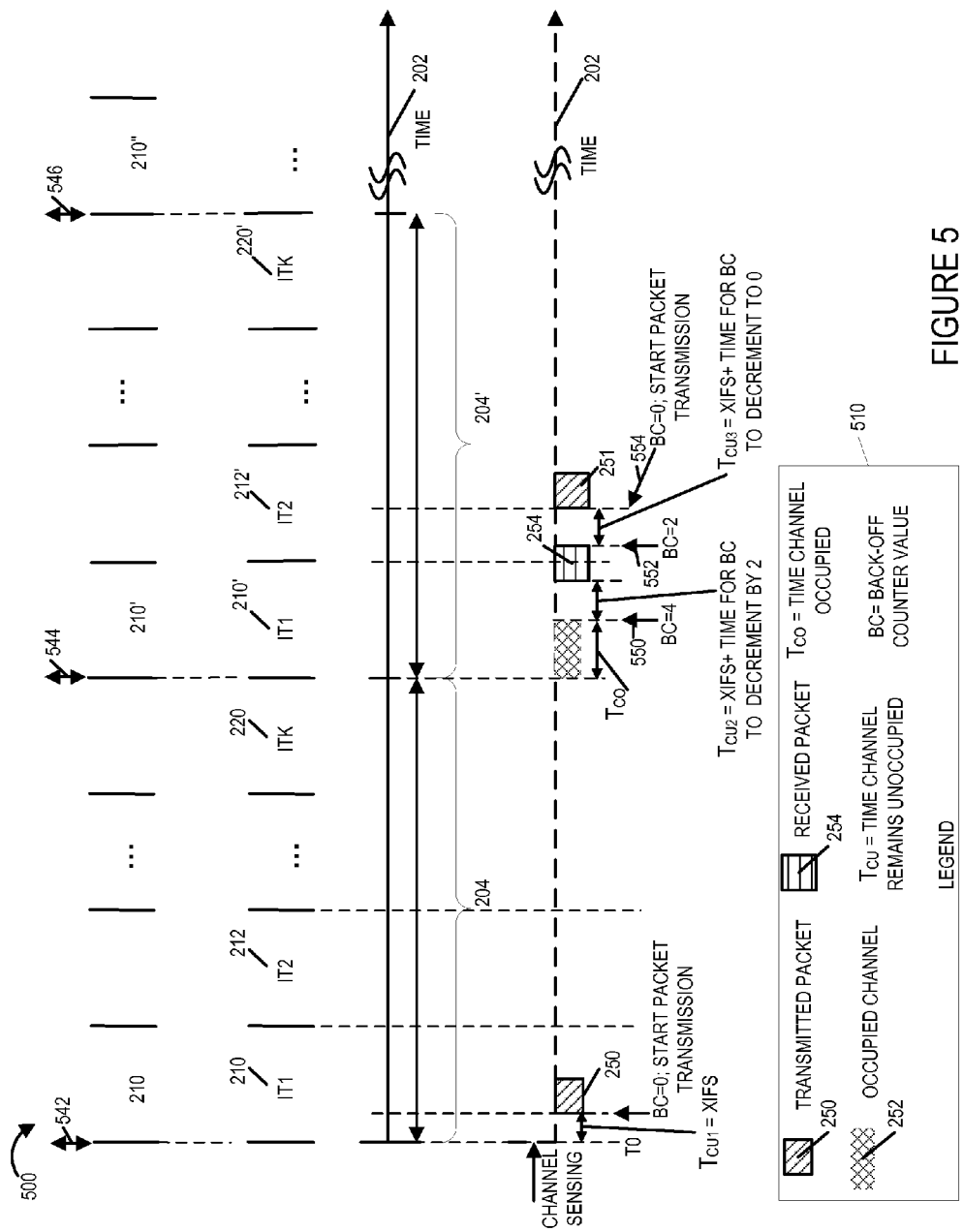
FIG. 5 illustrates yet another example showing packet transmission initiation in the selected transmission initiation intervals, back-off counter value decrement process and actual transmission of a packet in accordance with another exemplary embodiment.

FIG. 3 illustrates an example showing packet transmission initiation operation, back-off counter value decrement process and actual transmission of a packet in accordance with an exemplary embodiment. As discussed earlier, in accordance with one feature of some embodiments a communications device selects a subset of packet transmission initiation intervals corresponding to the broadcast intervals 204, 204'. In FIGS. 3-5 the broadcast interval timing structure 235 and transmission initiation interval timing structure 200 are shown along with exemplary packet transmissions. In the examples shown in FIGS. 3-5 the selected transmission initiation intervals are the first transmission intervals of each broadcast interval, i.e., transmission initiation intervals 210, 210', and 210".

In some embodiments, the actual time of a packet transmission may, and sometimes does, vary depending on airlink utilization by one or more devices, i.e., when another device ends a packet transmission. However, the transmission initiation intervals IT1 210, . . . , ITk 220 recur over time without regard to when actual packet transmission occurs. Thus, the packet transmission initiation intervals appear as a recurring set of time intervals which recur in a predictable manner.

As should be appreciated, while packet transmission may be initiated at a given point in time, the process of contending for transmission resource may result, e.g., due to use of the transmission resource and/or a back off timer, with the packet being transmitted at a later time. Thus, while there is a strong relationship between a packet transmission initiation time interval and the actual transmission time of a packet, there is no guarantee that a packet will actually be transmitted in the same time interval as the packet initiation time interval in which the packet transmission is initiated. However, this will often be the case. Thus, since the selected packet transmission initiation intervals occur in a periodic manner, assuming that a device has data to be transmitted on a regular basis, the corresponding packet transmission are likely to occur over the airlink in a periodic or semi-periodic manner with channel contention/back off timer selections possibly resulting in small variations in the spacing between actual packet transmissions.

In some but not necessarily all embodiments, packet transmission length is intentionally limited to sizes which can be transmitted in a fraction of the amount of time the physical layer allows a single communications device to continuously transmit, e.g., in an amount of time which is equal to a fraction of the duration of a packet transmission initiation interval. This is achieved, at least in some embodiments, by an application sending data to the transmitter device, e.g., physical layer, constraining the amount of data sent at a given time to less than the maximum amount that the transmitter, e.g., an 802.11p transmitter, could transmit in a single packet. By constraining the amount of data to be transmitted at any one time, in at least some embodiments the packet transmission length is intentionally limited to sizes which can be transmitted in an amount of time which is equal to or less than the duration of a packet transmission initiation interval. The physical layer need not be aware of the data constraint which can be imposed by the application or MAC layer module supplying the data to the transmitter for transmission. The constraint on the size of the packet that is transmitted increases the probability that multiple devices will be able to successfully transmit packets, e.g., packets which are intentionally constrained to being small packets, at short intervals on a regular, e.g., periodic or semi-periodic basis, than would be the case if devices sent larger sized packets which might delay transmissions by other devices due to the amount of time to transmit them through the communications channel and the effect this may have on delaying the transmissions of other devices.

In accordance with one feature, a device selects a subset of packet transmission initiation intervals to be associated with and then limits initiation of packet transmission to those intervals, e.g., initiation intervals 210, 210', 210". By selecting a subset of the packet initiation intervals, e.g., some fraction less than all the possible packet initiation intervals in the recurring timing structure, potential for collisions is reduced as compared to systems where all devices are allowed to contend for resources during all time periods.

For the purposes of discussion of the example illustrated in FIG. 3, consider that a communications device has a packet for transmission and selects the first packet transmission initiation interval corresponding to each of the broadcast intervals 204, 204', 204" to be associated with it, e.g., selects packet transmission initiation intervals 210, 210', 210" (although selecting more than one transmission initiation interval in each broadcast interval is possible). Thus the communications device associates recurring initiation intervals IT1 210, 210', 210" with itself. In the FIG. 3 example, arrows 342, 344 and 346 indicate the time at which a packet becomes available for transmission, e.g., packet is generated by an application for transmission. Note that the arrows 342, 344 and 346 are bidirectional which indicates that the packet is provided to a lower layer, e.g., MAC layer, for processing and transmission, at the same time when the packet becomes available since the device is already in the transmission initiation interval with regard to the timing structure. Thus packet transmission initiation may begin in each of the selected packet transmission initiation intervals 210, 210' and 210".

Note in FIG. 3 example that in the first and third selected packet transmission initiation interval 210, 210", it is illustrated using arrows 342 and 346 that the packet becomes available at the beginning of the selected initiation intervals 210, 210' and thus the device starts the packet transmission initiation process at that time, while in the selected transmission initiation interval 210' the packet becomes available not at the beginning but rather at a later time during the transmission initiation interval 210' and thus the device starts the packet transmission initiation process when the packet becomes available. For example, an application on the device generates and makes available a packet for transmission at the beginning of intervals 210, 210" as indicated using arrows 342 and 346, while a transmission packet may not be available to transmit at the start of the selected transmission initiation interval 210' but rather becomes available for transmission at a later time as shown by arrow 344. In another scenario a packet may become available for transmission prior to the beginning of a selected transmission initiation interval, however in such a case in some embodiments the device will still have to wait for its selected transmission initiation interval to start the packet transmission initiation. Thus it should be appreciated that in accordance with various embodiments, it is possible to initiate the packet transmission initiation process at any time within a selected initiation interval and not necessarily at the start of a transmission initiation interval.

FIGS. 3-5 are illustrated and discussed with the assistance of legend 310. Legend 310 identifies different patterns and/or abbreviations used to illustrate and/or represent various elements in FIGS. 3-5. Legend 310 identifies that a box with diagonal lining pattern is used to represent actual transmission of a packet, e.g., such as packets 250, 251 transmitted by the communications device. In FIG. 3, $T_{CU}$ indicates the time period for which the carrier remains unoccupied. BC is an abbreviation used for back-off counter value. As discussed, when a communications device has packet data for transmission, if its backoff counter is zero, and its channel sensing indicates that the channel is idle for a DIFS or EIFS time period (depending on the result of the last packet transmission in the system), the device can transmit its packet. If the channel is occupied or becomes occupied during the DIFS or EIFS time period during which channel sensing is performed after the backoff counter reaches zero, the device performs a second back-off operation based on a newly selected backoff counter value thereby deferring the transmission until the expiration of the newly selected back-off counter value, e.g., after the back-off counter value decrements to zero. The back-off counter value is decremented based on detecting that the channel is empty for one or more slot times, e.g., with the backoff counter being decremented once for each empty slot time following a vacant DIFS or EIFS period.

In the FIG. 3 example, the communications device performs channel sensing operation to control backoff counter decrementing and/or to determine if the channel is unoccupied for purposes of avoiding a collision prior to transmission. The device continues channel sensing and when a packet becomes available for transmission the device initiates the packet transmission process, e.g., by notifying the physical transmitter device that there is packet data to be transmitted, during one of the selected subset of transmission initiation intervals 210, 210', 210''. In accordance with various embodiments, the packet transmission will be initiated at the start of the selected transmission initiation interval immediately following the point in time the packet data becomes available to transmit if the packet data becomes available for transmission outside of a packet transmission initiation interval. If the data to be transmitted becomes available during a transmission initiation interval in the devices selected subset of transmission intervals 210, 210', 210'' the device may begin the transmission process immediately, e.g., by having the application which generated the data to be transmitted supplying it to the transmission system, e.g., physical layer, immediately.

As indicated by arrow 342 at the beginning of the device's selected transmission initiation interval 210 a packet is available for transmission. Thus the device starts the packet transmission initiation process. Initiation of packet transmission triggers an attempt to transmit the packet by providing the data to be transmitted to the transmission system. The transmission process normally includes a channel sensing operation which is performed after the backoff counter reaches zero if it was not zero at the time the data was provided to the transmission system as part of the packet transmission initiation process.

As shown, the channel sensing indicates that the channel is unoccupied, e.g., airlink transmission resources are not being used by one or more other devices or the signal energy detected on the transmission resources is below a threshold level which makes the broadcast channel available for use. The device waits for a XIFS(EIFS/DIFS) time period and transmits the packet 250. During initial packet transmission the device does not perform a back-off if the carrier is found to be unoccupied by carrier sensing, and thus the minimum time period for which the channel needs to be unoccupied before transmission, denoted by $T_{CU}$, in this case equals an XIFS time period (unused DIFS or unused EIFS period).

After the successful transmission of packet the device continues channel sensing and selects a random back-off counter value. For the sake of example, consider that the communications device randomly selects a back-off counter value of BC=4. The device continues channel sensing and decrements the back-off counter value by one for each slot time the carrier remains unused. For the purpose of the example of FIG. 3, consider that the channel remains occupied after the transmission of packet 250 and becomes available/unoccupied in the next selected transmission initiation interval 210'. Thus in this situation, prior to the transmission initiation interval 210' the back-off counter could not decremented as the channel was occupied. In the interval 210', sensing that the channel is unoccupied, the device waits for an XIFS time period and starts decrementing the back-off counter for each empty slot following the XIFS time period. At a point in time when the packet becomes available for transmission as indicated by arrow 344, the device initiates packet transmission operation. The packet 251 is provided to the physical layer for processing and transmission. As part of the packet transmission initiation process, channel sensing is performed and the back-off counter value is checked at the time packet transmission initiation begins. As illustrated in FIG. 3, during the transmission initiation interval 210' the device waits for a total time period $T_{CU2}$ before transmitting the packet 251, where $T_{CU2}$ equals an XIFS time period plus time period for the back-off counter to decrement from the 4 to 0 ($T_{CU}$=XIFS+4 slot times). Packet 251 is transmitted when the back-off counter value decrements to zero, i.e., at BC=0 as illustrated in the figure. After the transmission of packet 251, carrier sensing is continued and the device again selects a random back-off value. As discussed, the back-off counter is decremented by one for each predetermined amount of time, e.g., slot time, for which the channel remains unused. When the counter value reaches zero it will be kept at that value until a packet transmission operation is initiated.

It should be appreciated that in this particular example the actual packet transmission occurs in the same transmission initiation intervals 210, 210' in which the packet initiation occurs, however it may not necessarily be the case in all embodiments.

FIG. 4 illustrates another example showing packet transmission initiation operation, back-off counter value decrement process and actual transmission of a packet in accordance with another exemplary embodiment. In the FIG. 4 example, arrows 442, 443 and 446 indicate the time at which a packet becomes available for transmission, e.g., packet is generated by an application for transmission. Note that arrow 443 is unidirectional indicating that the packet is generated and is available for transmission, however since the selected transmission initiation interval has not yet arrived, the packet is not provided to a physical layer for transmission until that selected transmission initiation interval 210' begins. This is shown using arrow 444. Arrows 442, 446 are bidirectional which indicates that the generated packets are provided to the physical layer, e.g., MAC layer, for transmission, at the same time when the packets become available since the device is already in the transmission initiation interval (210, 210'') with regard to the timing structure.

In addition to the patterns and/or abbreviations identified in legend 310, legend 410 identifies some additional patterns and/or abbreviations used to illustrate and/or represent various elements in FIGS. 4-5. Legend 410 identifies that a criss cross pattern 252 is used to represent occupied channel, that $T_{CO}$ indicates the time period during which the carrier remains occupied, that $T_{CU}$ indicates the minimum time period during which the carrier remains unoccupied before a packet can be transmitted, and BC is an abbreviation used for back-off counter value.

As indicated by arrow 442 at the beginning of the device's selected transmission initiation interval 210 a packet is available for transmission. Thus the device starts the packet transmission initiation process. As shown, the channel sensing indicates that the channel is unoccupied. Thus the device waits for time period $T_{CU1}$ equals an XIFS time period and transmits the packet 250.

After the successful transmission of packet the device continues channel sensing and selects a random back-off counter value. For the sake of example, consider that the communications device randomly selects a back-off counter value of BC=2. The device continues channel sensing and decrements the back-off counter value by one for each slot time the carrier remains unused. Once again, for the purpose of the example of FIG. 4, consider that the channel remains occupied after the transmission of packet 250. Further more consider that the carrier remains further occupied, as shown using pattern 252, for a time period indicated as $T_{CO}$ during the device's selected initiation interval 210'. As the packet 251 is available when the device's selected initiation interval 210' arrives, the device starts packet transmission initiation at a point in time indicated by arrow 444, e.g., by providing the generated packet 251 to the physical layer, and channel sensing is performed. As the channel sensing indicates that the channel is occupied, the communications device does not begin decrementing the back-off counter for the time period $T_{CO}$. At the end of $T_{CO}$ the carrier becomes available/idle. After sensing that the carrier is unoccupied, the device waits for an XIFS time period and starts decrementing the back-off counter for each empty slot following the XIFS time period. As illustrated in FIG. 4, the device waits for a total time period $T_{CU2}$ which equals an XIFS time period, plus time period for the back-off counter to decrement from the 2 to 0 ($T_{CU}$=XIFS+2 slot times). Actual transmission of packet 251 starts when the back-off counter value decrements to zero, i.e., at BC=0, as illustrated in the figure. After the transmission of packet 251, carrier sensing is continued and the device again selects a random back-off value. As discussed, the back-off counter is decremented by one for each predetermined amount of time, e.g., slot time, for which the channel remains unused. When the counter value reaches zero it will be kept at that value until a packet transmission operation is initiated.

It should be noted that in the FIG. 4 example, the actual packet 251 transmission occurs partially in transmission initiation interval IT2 212' although the packet transmission began in the selected transmission initiation interval IT1 210'. Thus it should be appreciated that while packet transmission may be initiated at a given point in time during the selected transmission initiation interval, e.g., 210', due to channel occupancy/usage of transmission resources during at least a portion of the initiation interval IT1 210', the packet 251 gets transmitted at a later time. Thus, it should be appreciated that there is no guarantee that a packet will actually be transmitted in the same time interval as the packet initiation time interval in which the packet transmission is initiated.

FIG. 5 illustrates yet another example showing packet transmission initiation operation, back-off counter value decrement process and actual transmission of a packet in accordance with an exemplary embodiment. The FIG. 5 example illustrates another scenario where an actual packet transmission occurs in a different time interval than the packet initiation time interval in which the packet transmission is initiated. FIG. 5 is illustrated with the aid of legends 310, 410 and 510. In addition to the notations and patterns identified and discussed with regard to legends 310, 410 consider legend 510 which identifies that $T_{UO}$' represents a total minimum unoccupied channel time, detected during channel sensing operation by the communications device, before packet 251 could be transmitted. It should be appreciated that the channel is considered occupied either when the channel is detected as being used by other device or even if the communications device performing channel sensing itself is using the channel, e.g., for receiving or transmitting a packet.

Arrows 542, 544 and 546 indicate the time at which a packet becomes available for transmission, e.g., packet is generated by an application for transmission. Note that the arrows 542, 544 and 546 are bidirectional which indicates that the packet is provided to a lower layer, e.g., MAC layer, for transmission, at the same time when the packet becomes available since the device is already in the transmission initiation interval with regard to the timing structure.

In addition to patterns and/or abbreviations identified in legends 310, 410, legend 510 identifies some additional patterns and/or abbreviations used to illustrate and/or represent various elements in FIG. 5. Legend 510 identifies that a box with horizontal lining pattern is used to represent an actual received packet 254 received by the communications device, that $T_{CO}$ indicates the time period during which the carrier remains occupied, e.g., used by another device, that $T_{CU}$ indicates the minimum time period during which the carrier remains unoccupied before a packet can be transmitted. In the FIG. 5 example, the initial packet 250 transmission process is similar to what was discussed with regard to FIGS. 3 and 4, and thus will not be discussed in detail again. After the successful transmission of packet 250 the device continues channel sensing and selects a random back-off counter value. For the FIG. 5 example, consider that the communications device randomly selected a back-off counter value of BC=4. Once again, for the purpose of the example of FIG. 5, consider that the channel remains occupied after the transmission of packet 250. When the communications device's selected initiation interval 210' arrives, the carrier remains further occupied, as shown using pattern 252, for a time period indicated as $T_{CO}$. Thus the communications device does not begin the packet transmission initiation process for the time period $T_{CO}$ as long as the channel remains busy. At the end of $T_{CO}$, after sensing that the carrier is unoccupied, the device waits for an XIFS time period and starts decrementing the back-off counter for each empty slot following the XIFS time period.

In the example of FIG. 5, it is illustrated that the communications device, following an unused XIFS time period, is able to decrement the BC value only by 2 slot times before the channel sensing operation detects that the channel becomes occupied again. Note that the arrow 550 indicates the point in time where BC=4, and after time period $T_{CU2}$, when the back-off counter decrements from BC=4 to BC=2, the channel becomes occupied again, and in accordance with the back-off counter decrement rules previously discussed, the counter decrement process is halted, where $T_{CU2}$ equals an XIFS time period plus time period for the back-off counter to decrement from the 4 to 2 ($T_{CU}$=XIFS+2 slot times). As illustrated in FIG. 5, the communications device receives a packet 254 when the channel is detected to be reoccupied following time period $T_{CU2}$. As should be appreciated from the figure, this occurs without any regard to the exemplary transmission initiation interval boundaries (e.g., IT1 210 boundary) and the packet 254 is received partially in IT2 212.

In accordance with the back-off counter decrementing rules, the back-off counter value starts decrement again from the current back-off counter value when the channel sensing detects that the channel remains unoccupied for at least a DIFS time period after successfully receiving the packet 254. Thus when the communications device detects that the channel remains unoccupied for a DIFS time period, it starts decrementing the back-off counter value once again from its current value, i.e., BC=2 as indicated by arrow 552. The back-off counter decrements as long as the carrier remains unoccupied until the back-off counter expires, i.e., BC=0. As should be appreciated from FIG. 5, the actual packet transmission occurs after time period $T_{CU3}$, where $T_{CU3}$ equals an XIFS time period plus time period for the back-off counter to decrement from BC=2 to 0. Arrow 554 indicates the point where BC=0 and the packet transmission occurs. It should be noted that the actual packet transmission occurs in IT2 212' even though the packet transmission began in the communications device selected transmission initiation interval IT1

210' when the back-off counter decrement process started. Thus in some embodiments the communications device transmits the packet 251 at a time which is different from the time at which the packet transmission was initiated.

Thus it should be appreciated that while packet transmission is initiated at a given point in time during the selected transmission initiation interval IT1 210', in some embodiments the communications device transmits or receives packets without synchronization to transmission initiation interval boundaries occurring within the recurring broadcast interval. In some embodiments the communications device transmits or receives a packet which is transmitted during a time period which spans a boundary between packet transmission broadcast intervals, e.g., 204, 204'. In the FIG. 5 example, the device waits for a total time period $T_{CU}=T_{CU2}+T_{CU3}$ before the packet 251 is actually transmitted.

Figure 6:
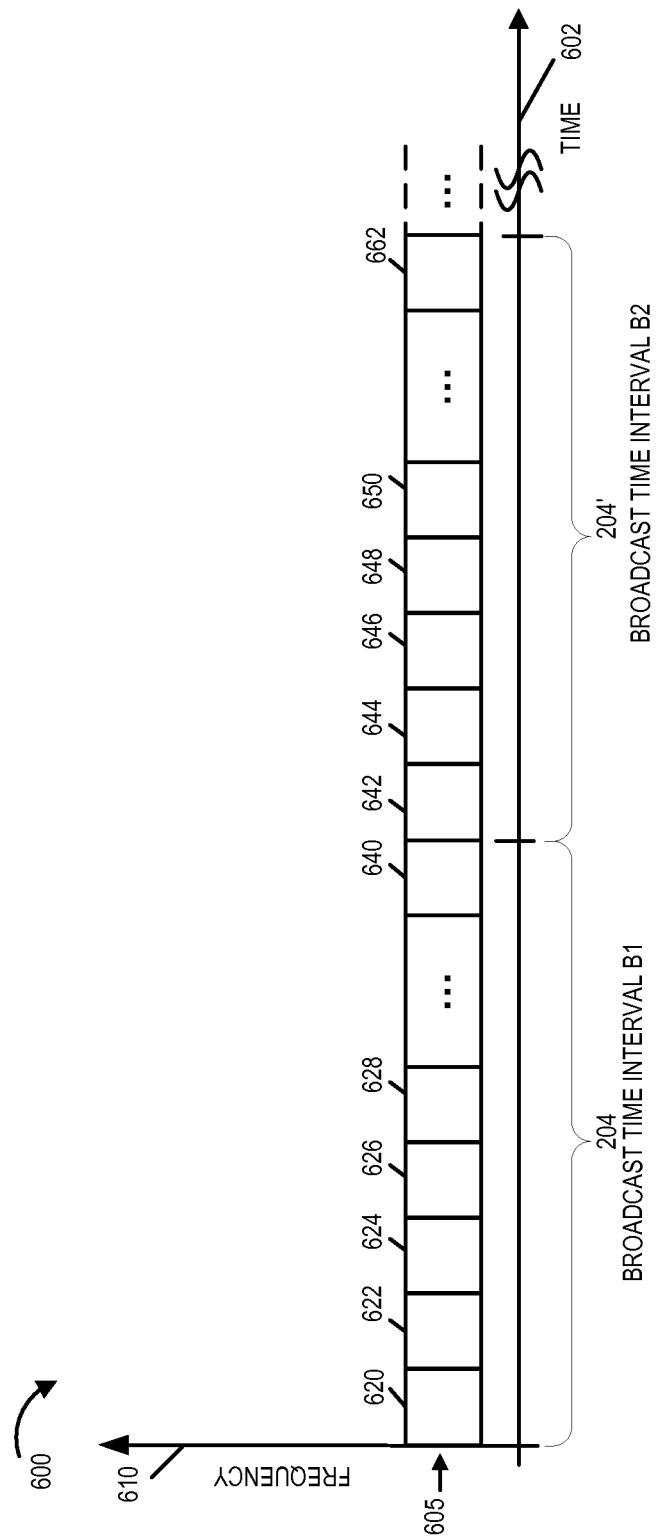
FIG. 6 illustrates an exemplary time-frequency structure of an exemplary broadcast channel which can be used by communications devices in accordance with an exemplary embodiment.

FIG. 6 illustrates an exemplary time frequency structure 600 of an exemplary broadcast channel which can be used by communications devices in the exemplary wireless communications system 100 of FIG. 1. In FIG. 6, the horizontal axis 602 represents time and the vertical axis 610 represents frequency. The horizontal time axis 602 is the same as or similar to the time axis 202 of FIGS. 2-5 and shows the timing structure of a broadcast channel 605, e.g., recurring broadcast intervals 204, 204', and thus same reference numbers are used to identify the recurring broadcast intervals as used in FIGS. 2-5. The exemplary time frequency structure 600 includes the broadcast channel 605 which is used, in some embodiments, for control signaling communications.

In accordance with various embodiments the broadcast channel 605 is partitioned into a plurality of transmission resources, e.g., OFDM air link resources, which are used for communicating, e.g., transmitting and/or receiving, information. Each recurring broadcast interval includes, e.g., M transmission resources. Transmission resources 620 through 640 correspond to the first broadcast time interval 204 while transmission resources 642 through 662 correspond to the second broadcast time interval 204'. In the FIG. 6 example, each individual transmission resource is an OFDM tone symbol.

In various embodiments the air link transmission resources shown in FIG. 6 are used for the transmitting and/or receiving packets, e.g., such as the packets 250, 251 and 254 illustrated in FIG. 5. In accordance with one aspect, the broadcast channel 605 is available for use by various communications devices. In accordance with one feature of some embodiments when the communications devices wish to transmit, the devices sense the channel 605 to determine if the channel 605 is occupied or idle, e.g., unoccupied. When the channel 605 is unoccupied, the devices follow the above discussed channel access process to access the channel, e.g., for transmitting a packet. During channel sensing operation, the communications devices monitor to detect energy on the airlink transmission resources during the broadcast intervals. Based on the energy detected on the transmission resources during the monitored broadcast time intervals, amount of airlink resource utilization during the monitoring period is determined and thus a determination whether the channel is busy or idle can be made.

Figure 7:
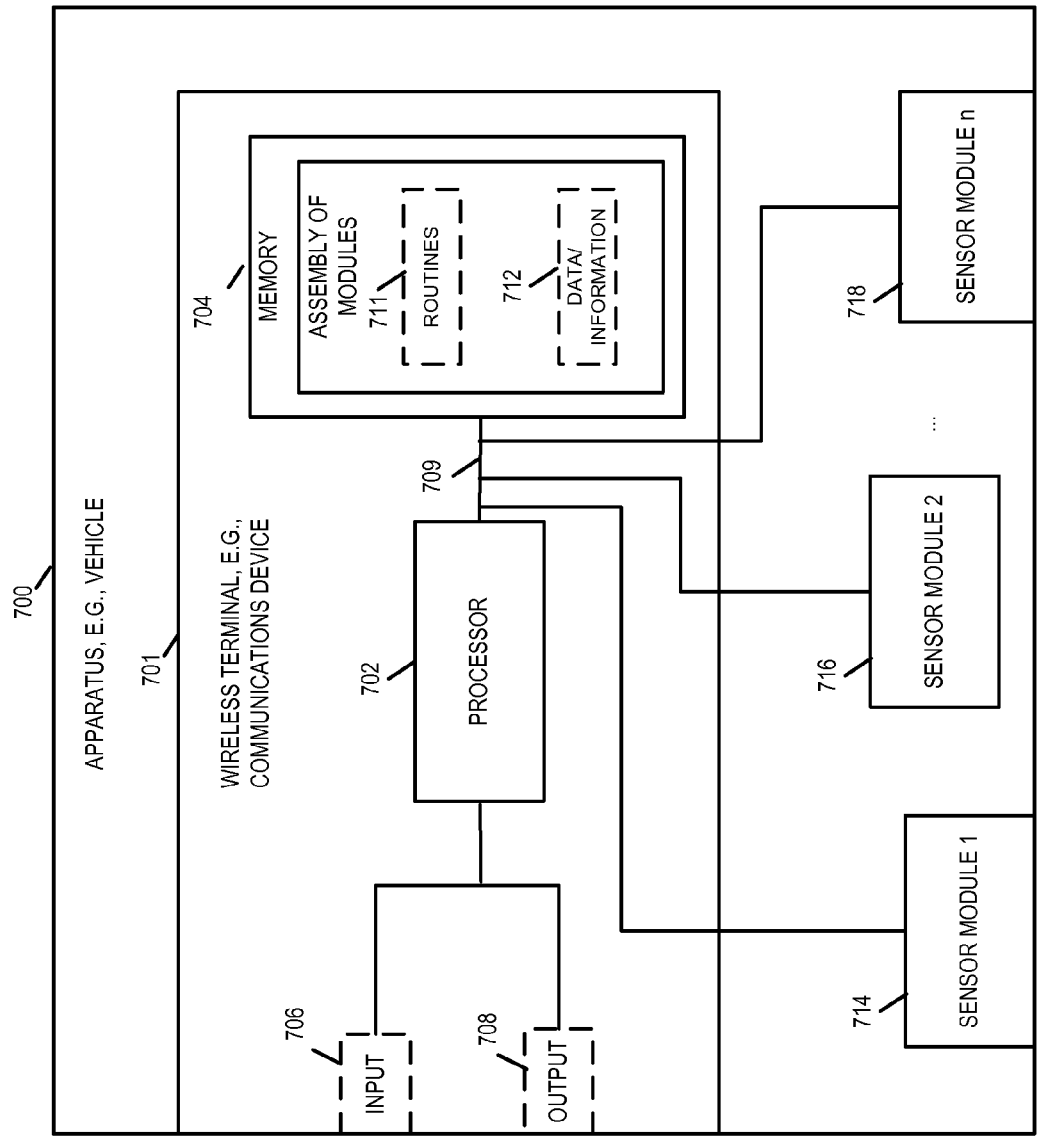
FIG. 7 is a drawing of an exemplary apparatus including a communications device, e.g., a vehicle supporting wireless communications, in accordance with various embodiments.

FIG. 7 is a drawing of an exemplary apparatus 700, e.g., a vehicle. Exemplary apparatus 700 is, e.g., any of the vehicles (102, 104, 106, 108, 110, ..., 112) of the system 100 of FIG. 1. Exemplary apparatus 700 includes a wireless terminal 701, e.g., a wireless communications device, and a plurality of sensor modules (sensor module 1 714, sensor module 2 716, ..., sensor module n 718) coupled together. In some embodiments, one or more of the sensor modules (714, 716, ..., 718) are included as part of the wireless terminal 701. In some embodiments, the wireless terminal and/or sensor modules are aftermarket components which are installed in a vehicle. In some embodiments, the wireless terminal and/or sensor modules are integral part of a vehicle, e.g., included as part of factory build. In some such embodiments, the wireless terminal and sensor modules are included as standard built in equipment in the vehicle.

Wireless terminal 701 is, e.g., a mobile wireless communications device which supports a peer to peer signaling protocol. In some embodiments, the peer to peer signaling protocol is an 802.11 based protocol or similar protocol. Wireless terminal 701 can be used as any one of the wireless terminal included in the vehicles (102, 104, 106, 108, 110, ..., 112) shown in system 100. Wireless terminal 701 includes a processor 702 and memory 704 coupled together via a bus 709 over which the various elements (707, 704) may interchange data and information. Wireless terminal 701 further includes an input module 706 and an output module 708 which may be coupled to processor 702 as shown. However, in some embodiments, the input module 706 and output module 708 are located internal to the processor 702. Input module 706 can receive input signals. Input module 706 can, and in some embodiments does, include a wireless receiver and/or a wired or optical input interface for receiving input. Output module 708 may include, and in some embodiments does include, a wireless transmitter and/or a wired or optical output interface for transmitting output. In some embodiments, memory 704 includes routines 711 and data/information 713.

In various embodiments the processor 702 is configured to store, e.g., in memory 704, information defining a plurality of transmission initiation intervals, the transmission initiation intervals corresponding to a recurring broadcast interval including multiple packet transmission initiation opportunities. In various embodiments the recurring broadcast interval is a recurring time period in a timing structure, e.g., time interval 204 in timing structure 200, used to control wireless transmissions, said communication device being associated with said selected subset of transmission initiation intervals for multiple sequential broadcast intervals. Thus the processor 702 stores information defining the transmission initiation interval timing structure 200 imposed on top of the broadcast interval timing structure 235. In various embodiments each broadcast interval includes multiple packet transmission initiation opportunities.

In various embodiments the processor 702 is further configured to monitor for use of transmission resources, e.g., transmission resources 622, 624, ..., during at least a portion of the recurring broadcast interval, e.g., broadcast interval 204. The monitoring is performed to determine the amount of airlink resource utilization, e.g., to detect if the broadcast channel resources are being used by another device or are unoccupied. The processor 702 in some embodiments is further configured to, as part of the monitoring, measure signal energy on the transmission resources to determine the utilization of the transmission resources.

In various embodiments, processor 702 is further configured to monitor to receive packets. Processor 702 is further configured to receive packets, and in some embodiments said processor is further configured to receive one or more packets without synchronization to transmission initiation boundaries occurring within the recurring broadcast interval. In some embodiments processor 702 is further configured to receive a packet which is transmitted during a time period which spans a boundary between packet transmission broadcast intervals.

In various embodiments the processor 702 is further configured to identify transmission initiation intervals having an average or maximum amount of signal energy detected on the transmission resources, during said monitoring, below a first threshold. Thus the processor 702 is configured to monitor transmission resources and identify one or more transmission initiation intervals, e.g., IT1 210, IT2 212, ..., ITk 220, where an average or maximum signal energy detected on the transmission resources is below a first threshold, e.g., a predetermined threshold.

The processor 702 is further configured to select one or more transmission resources and transmission initiation intervals corresponding to the recurring broadcast interval. In some embodiments the processor is further configured to select a subset, e.g., one or more, of transmission initiation intervals, corresponding to a portion of said recurring broadcast interval 204, as a function of signals, e.g., based on the energy of the signals, detected on the transmission resources during the monitoring operation. In some embodiments, the processor 702 selects subset of packet transmission initialization intervals to include one or a few of the transmission initiation time intervals corresponding to the time intervals in which the least signal energy was detected. In some embodiments selecting a subset of transmission initiation intervals includes selecting one of K transmission initiation intervals IT1 210, ..., ITK 222, where K is an integer greater than 2, said subset including less than K selected transmission initiation intervals.

In some embodiments the processor 702 is further configured to select a subset of tones, e.g., OFDM tone symbols, to be used for packet transmission as a function of measured signal energy on said transmission resources. In some embodiments the processor 702 is configured to select transmission resources on which the lowest signal energy is detected for packet transmission.

In some embodiments the processor 702 is further configured to select, as part of being configured to select a subset of transmission initiation intervals, a transmission initiation interval from the identified transmission initiation intervals according to a pseudo random function. In some embodiments the processor 702 is further configured to select a transmission initiation interval having the lowest amount of detected signal energy on the selected subset of tones.

Processor 702 in some embodiments is further configured to restrict initiation of packet transmission to transmission initiation intervals associated with the communications device, initiation of packet transmission triggering an attempt to transmit a packet, said attempt to transmit including a channel sensing operation.

In various embodiments the processor 702 is further configured to initiate, on a periodic basis, transmission of a packet communicating information. In various embodiments the initiation of packet transmission includes performing channel sensing operation, e.g., to determine if the broadcast channel is being used. Thus in various embodiments the processor 702 is configured to perform channel sensing operation, e.g., on the broadcast channel with the timing structure 235 illustrated in FIG. 2.

In various embodiments, as part of the initiation of packet transmission, the processor 702 performs channel sensing and when unoccupied channel is detected, waits for a predetermined EIFS/DIFS time period for which the channel must remain unoccupied, before starting a back-off operation.

The processor 702 is further configured to perform, following initiation of a packet transmission, a back-off operation including use of a randomly selected back-off, e.g., back-off counter value, to determine a packet transmission time used for transmission of said packet. In various embodiments determining a packet transmission time is further based on a carrier sensing operation used in controlling a countdown process, e.g., back-off counter decrement process, used to determine expiration of the randomly selected back-off. In various embodiments the processor 702 controls the communications device 701 to perform the back-off operation, i.e., back-off counter decrement process, in accordance with various rules discussed earlier, which are, e.g., stored in memory 704. In some embodiments the processor 702 is configured to control a transmitter, e.g., output module 708, to transmit the packet when the back-off counter value expires.

Processor 702, in various embodiments, is further configured to limit the packet transmission length to a packet length which can be transmitted in a time period corresponding to a transmission initiation interval, e.g., IT1 210. In some embodiments the packet length is limited, in terms of time span for packet transmission, to a fraction of the transmission initiation time interval. In some embodiments the processor 702 is further configured to transmit the packet, in response to the initiation of packet transmission of the packet, at a time determined by a transmission resource contention mechanism. In some embodiments each transmission initiation interval has a duration which is a fraction of a maximum permitted continuous transmission time period which can be used to transmit a packet.

In some embodiments, the processor 702 is further configured to transmit a packet at a time in a packet transmission initiation interval which is different from the packet transmission initiation interval in which packet transmission was initiated. The time of packet transmission may be, and in some embodiments is, different than the time at which packet transmission initiation was started.

In some embodiments, the processor 702 is further configured to perform at least one of: transmit or receive a packet without synchronization to transmission initiation interval boundaries occurring within the recurring broadcast interval. In some embodiments, the processor 702 is further configured to transmit or receive a packet which is transmitted during a time period which spans a boundary between packet transmission initiation intervals.

Figure 8A:
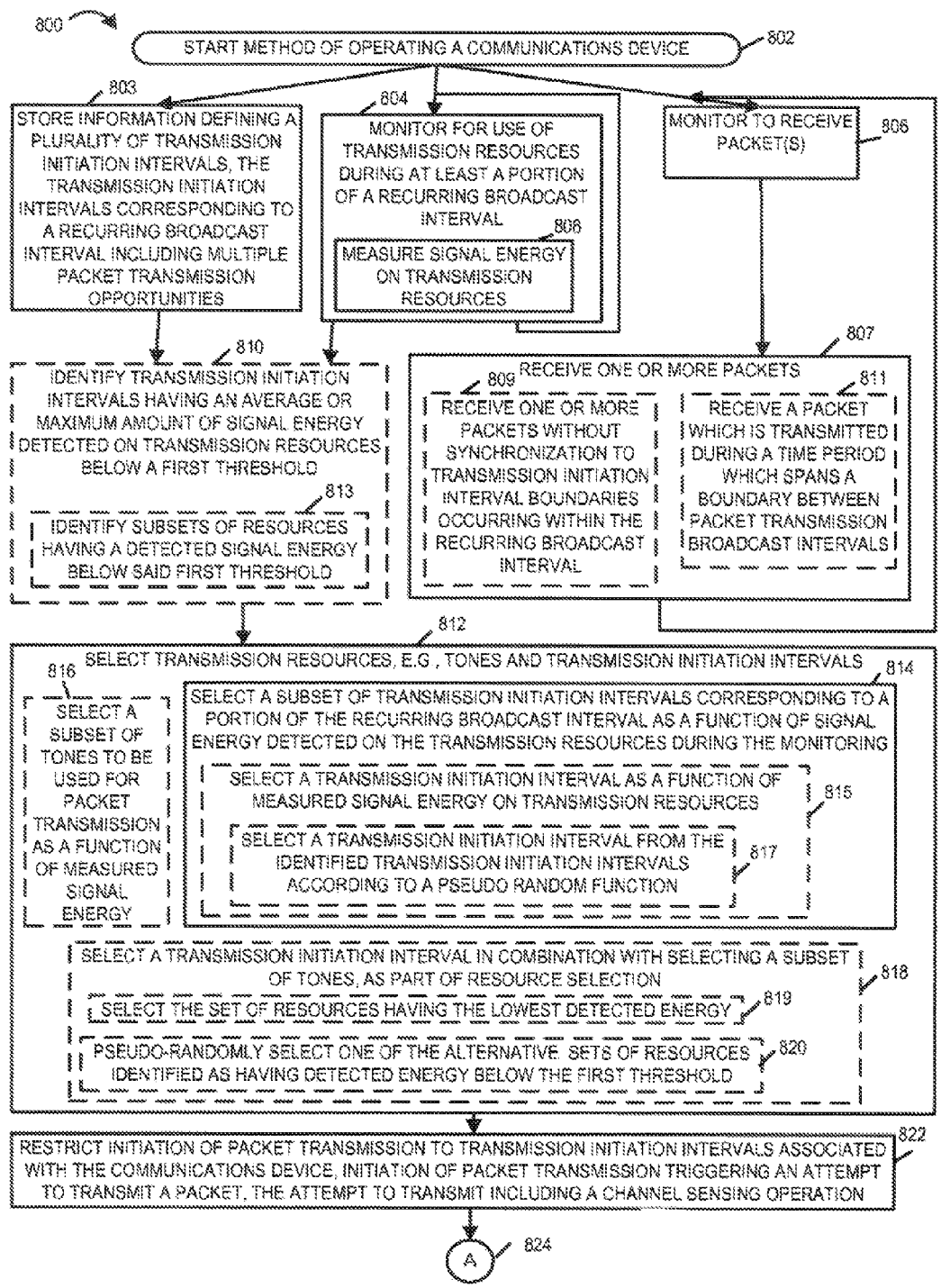
FIG. 8, which comprises a combination of FIGS. 8A and 8B, is a flowchart illustrating an exemplary method of operating a communications device in accordance with an exemplary embodiment.
Figure 8B:
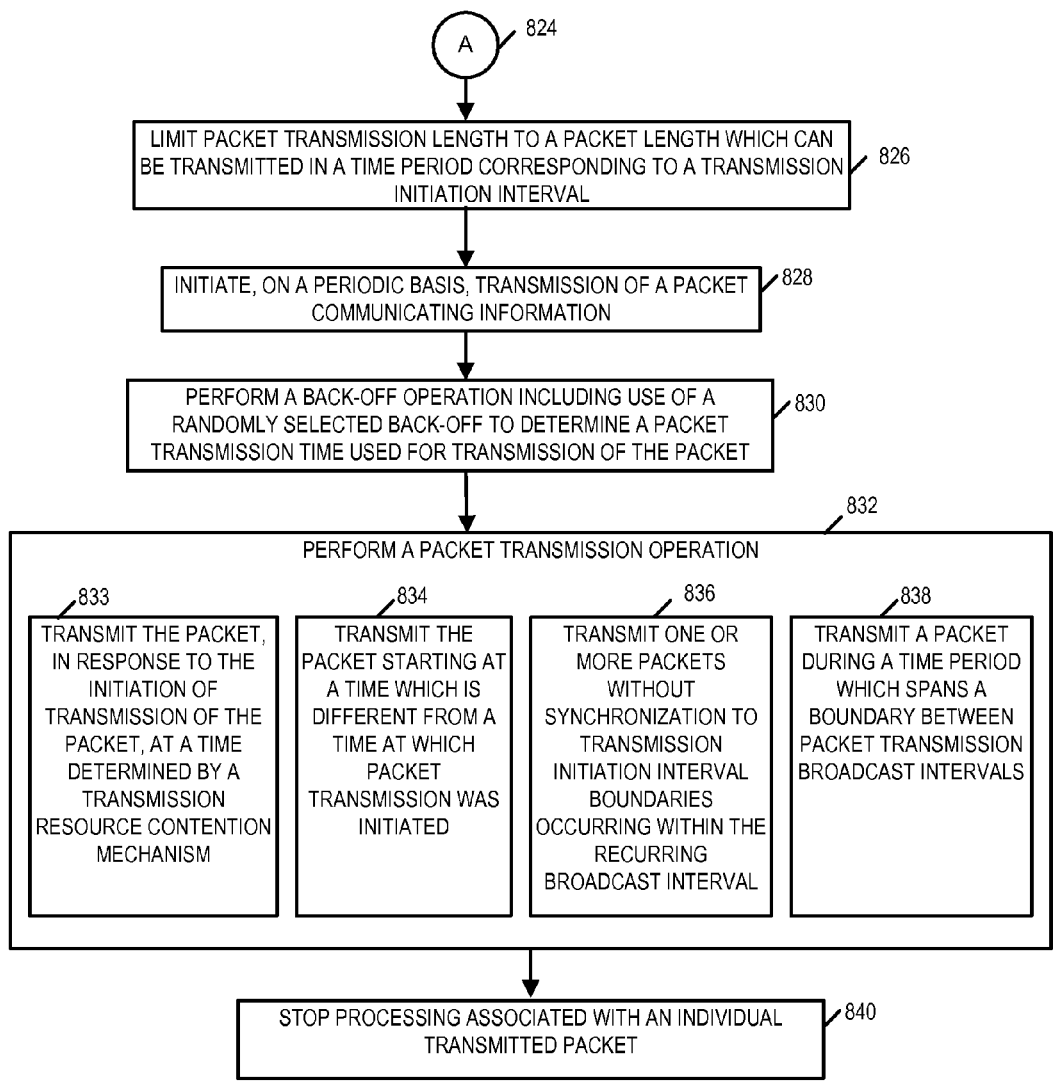

FIG. 8, which comprises a combination of FIGS. 8A and 8B, is a flowchart 800 illustrating an exemplary method of operating a wireless communications device in accordance with various embodiments. The method of flowchart 800 of FIG. 8 may be implemented by a wireless terminal, e.g., wireless terminal 701 of apparatus 700 of FIG. 7.

The exemplary method of flowchart 800 starts in step 802, where the wireless terminal is powered on and initialized. Operation proceeds from start step 802 to steps 803, 804 and 806.

In step 803 the communications device stores information defining a plurality of transmission initiation intervals, the transmission initiation intervals corresponding to a recurring broadcast interval including multiple packet transmission initiation opportunities. In various embodiments the recurring broadcast interval is a recurring time period in a timing structure, e.g., time interval 204 in timing structure 200, used to control wireless transmissions, said communication device being associated with said selected subset of transmission initiation intervals for multiple sequential broadcast intervals. Thus in step 803 the communications device stores information defining the transmission initiation interval timing structure 200 imposed on top of the broadcast interval timing structure 235. As discussed in detail with regard to FIGS. 2-5, each broadcast interval includes multiple packet transmission initiation opportunities. Operation proceeds from step 803 to step 810.

In step 804 which may, and in some embodiments is, performed on an ongoing basis during a broadcast time interval, e.g., broadcast interval 204, the communications device monitors for use of transmission resources, e.g., transmission resources 622, 624, . . . , during at least a portion of said recurring broadcast interval. The device performs monitoring to determine the amount of airlink resource utilization during the monitoring period, e.g., to detect if the broadcast channel resources are being used by another device or are unoccupied. In various embodiments, step 808 is performed as part of step 804, where the communications device measures signal energy on the transmission resources to determine the utilization of the transmission resources. Operation proceeds from step 804 to step 810.

Step 806 is performed asynchronously. In step 806 the communications device monitors to receive packet(s), e.g., packet communicating information from another device. Operation proceeds from step 806 to step 807. In step 807 the device receives one or more packets, e.g., from another communications device. In some embodiments, step 807 includes at least one of step 809 or step 811. In step 809 the communications device receives one or more packets without synchronization to transmission initiation boundaries occurring within the recurring broadcast interval. For example, one such scenario is illustrated in the FIG. 4 example where the packet is transmitted without synchronization to transmission initiation interval boundary, e.g., across the boundary of transmission initiation interval IT1 210'. In some embodiments step 811 is performed wherein the device receives a packet which is transmitted during a time period which spans a boundary between packet transmission broadcast intervals.

Returning now to step 810, in step 810 the communications device identifies transmission initiation intervals having an average or maximum amount of signal energy detected on transmission resources, during said monitoring, below a first threshold. Thus the communications device monitors transmission resources and identifies one or more transmission initiation intervals, e.g., IT1 210, IT2 212, . . . , ITk 220, where an average or maximum signal energy detected on the transmission resources is below a first threshold, e.g., a predetermined threshold. In some embodiments, there are multiple non-overlapping predetermined sets of resources corresponding to a transmission initiation time interval, e.g., a predetermined first subset of tones available for use during the transmission initiation time interval and a predetermined second subset of tones available for use during the transmission initiation time interval, which are evaluated in terms of received signal energy. In some embodiments, step 810 includes step 813 in which the communications device identifies subsets of resources having a detected signal energy below the first threshold. Operation proceeds from step 810 to step 812.

In step 812 the communications device selects one or more transmission resources and transmission initiation intervals corresponding to the recurring broadcast interval. Step 814 is performed as part of selection step 812. In step 814 a subset, e.g., one or more, of transmission initiation intervals, corresponding to a portion of said recurring broadcast interval 204, are selected as a function of signals, e.g., based on the energy of the signals, detected on the transmission resources during the monitoring operation. In some embodiments, the selected subset of packet transmission initialization intervals is selected to include one or a few of the transmission initiation time intervals corresponding to the time intervals in which the least signal energy was detected. In some embodiments selecting a subset of transmission initiation intervals includes selecting one of K transmission initiation intervals IT1 210, . . . , ITK 222, where K is an integer greater than 2, said subset including less than K selected transmission initiation intervals.

In some embodiments, step 814 includes step 815 in which the communications device selects a transmission initiation interval as a function of measured signal energy on transmission resources. In some such embodiments, step 815 includes step 817 in which the communications device selects a transmission initiation interval from identified transmission initiation intervals, e.g., identified in step 810, according to a pseudo-random function. In some embodiments, the communications device, in step 815 selects the transmission initiation interval having the lowest detected signal energy on transmission resources. In some embodiments, in step 815 the communications device selects the transmission initiation interval having the lowest detected amount of signal energy on the selected subset of tones.

In some embodiments, step 812 includes one or more of steps 816 and 818. In step 816 the communications device selects a subset of tones to be used for packet transmission as a function of measured signal energy on transmission resources. In some embodiments transmission resources on which the lowest signal energy is detected are selected for packet transmission.

In step 818 the communications device selects a transmission initiation interval in combination with selecting a subset of tones, as part of resource selection operation. In some embodiments, step 818 includes one of step 819 and 820. In step 819 the communications device selects the set of transmission resources having the lowest detected energy. In some such embodiments, said resource selection operation selects the set of resources having the lowest detected energy from among a plurality of alternative sets of resources, each alternative set of resources being a non-overlapping tone subset and transmission initiation interval combination. In step 820 the communications device pseudo-randomly selects one of the alternative set of resources identified as having detected energy below the first threshold. In some such embodiments, the resource selection operation selects the set of resources having the lowest detected energy from among a plurality of alternative sets of resources, each alternative set of resources being a non-overlapping tone subset and transmission initiation interval combination.

Operation proceeds from step 812 to step 822. In step 822 the communications device restricts initiation of packet transmission to transmission initiation intervals associated with the communications device, initiation of packet transmission triggering an attempt to transmit a packet, said attempt to transmit including a channel sensing operation. Thus in some embodiments the communications device limits the initiation of packet transmission to the selected subset of transmission initiation intervals, e.g., selected transmission initiation intervals 210, 210', 210". It should be appreciated that by selecting a subset of the packet initiation intervals, and limiting the initiation of packet transmission to the selected subset of initiation intervals in the recurring timing structure, potential for collisions is reduced as compared to systems where all devices are allowed to contend for resources during all time periods. Thus by doing so, the communications devices operating in accordance with the method of flowchart 800 control when and/or how the devices contend for transmission resources, e.g., of a communications channel, e.g., for transmission of a packet.

Operation proceeds from step 822 to step 826 via connecting node A 824. In step 826 the device limits a packet transmission length to a packet length which can be transmitted in a time period corresponding to a transmission initiation interval, e.g., IT1 210. Thus it should be appreciated that in various embodiments the packet length is intentionally restricted to a length which can be transmitted within a transmission initiation interval. In some embodiments the packet length is limited, in terms of time span for packet transmission, to a fraction of the transmission initiation time interval. For example, in some embodiments the packet length is restricted to be less than or equal to one third of the duration of a packet transmission initiation interval.

In some embodiments each transmission initiation interval has a duration which is a fraction of a maximum permitted continuous transmission time period which can be used by the device to transmit a packet. Thus in some embodiments, there are N initiation intervals during a maximum permitted continuous transmission time period as permitted by the physical layer for transmission of a packet, and in accordance with one aspect the packet length is limited to much less than the maximum permitted transmission time to increase number of such initiation intervals.

Operation proceeds from step 826 to step 828. In step 828 the device initiates, on a periodic basis, transmission of a packet communicating information. In various embodiments the initiation of packet transmission includes performing channel sensing, e.g., to determine if the broadcast channel is being used. As discussed in detail earlier, as part of the initiation of packet transmission, the communications device performs channel sensing and when unoccupied channel is detected, waits for a predetermined EIFS/DIFS time period for which the channel must remain unoccupied. In some embodiments following the EIFS/DIFS time period, the device performs a back-off operation before transmitting the packet.

Operation proceeds from step 828 to step 830. In step 830 the communications device performs a back-off operation including use of a randomly selected back-off, e.g., back-off counter value, to determine a packet transmission time used for transmission of said packet. In various embodiments determining a packet transmission time is further based on a carrier sensing operation used in controlling a countdown process, e.g., back-off counter decrement process, used to determine expiration of the randomly selected back-off. The back-off counter decrement process used in various embodiments is discussed with regard to FIGS. 2-5. In some embodiments, packet transmission occurs when the back-off counter value expires.

Operation proceeds from step 830 to step 832. In step 832 the communications device performs a packet transmission operation. In various embodiments, performing a transmission operation includes performing at least one of steps 833, 834, 836 or 838.

In step 833 the packet is transmitted, in response to the initiation of packet transmission of the packet, at a time determined by a transmission resource contention mechanism. The packet transmission initiation and actual packet transmission is discussed with the help of various examples illustrated in FIGS. 3-5, and accordingly the discussion is not repeated.

The time of packet transmission may be different than the time at which packet transmission initiation was started. In some embodiments, step 834 is performed where the communications device transmits a packet at a time in a packet transmission initiation interval which is different from the packet transmission initiation interval in which packet transmission was initiated. For example, such an exemplary scenario is illustrated in FIGS. 4-5.

In some embodiments, step 836 is performed where the communications device transmits one or more packets without synchronization to transmission initiation interval boundaries occurring within the recurring broadcast interval. An example illustrating such a scenario is shown in FIG. 4 where packet 251 is transmitted without synchronization to transmission initiation interval boundaries IT1 210' and IT2 212'.

In some embodiments, step 838 is performed where the communications device transmits a packet during a time period which spans a boundary between packet transmission broadcast intervals.

Operation proceeds from step 832 to step 840 where the device stops the processing associated with an individual transmitted packet. However the operation of the device continues, e.g., with packets being generated, transmitted and/or received, on an ongoing basis.

Figures 9, 9A:
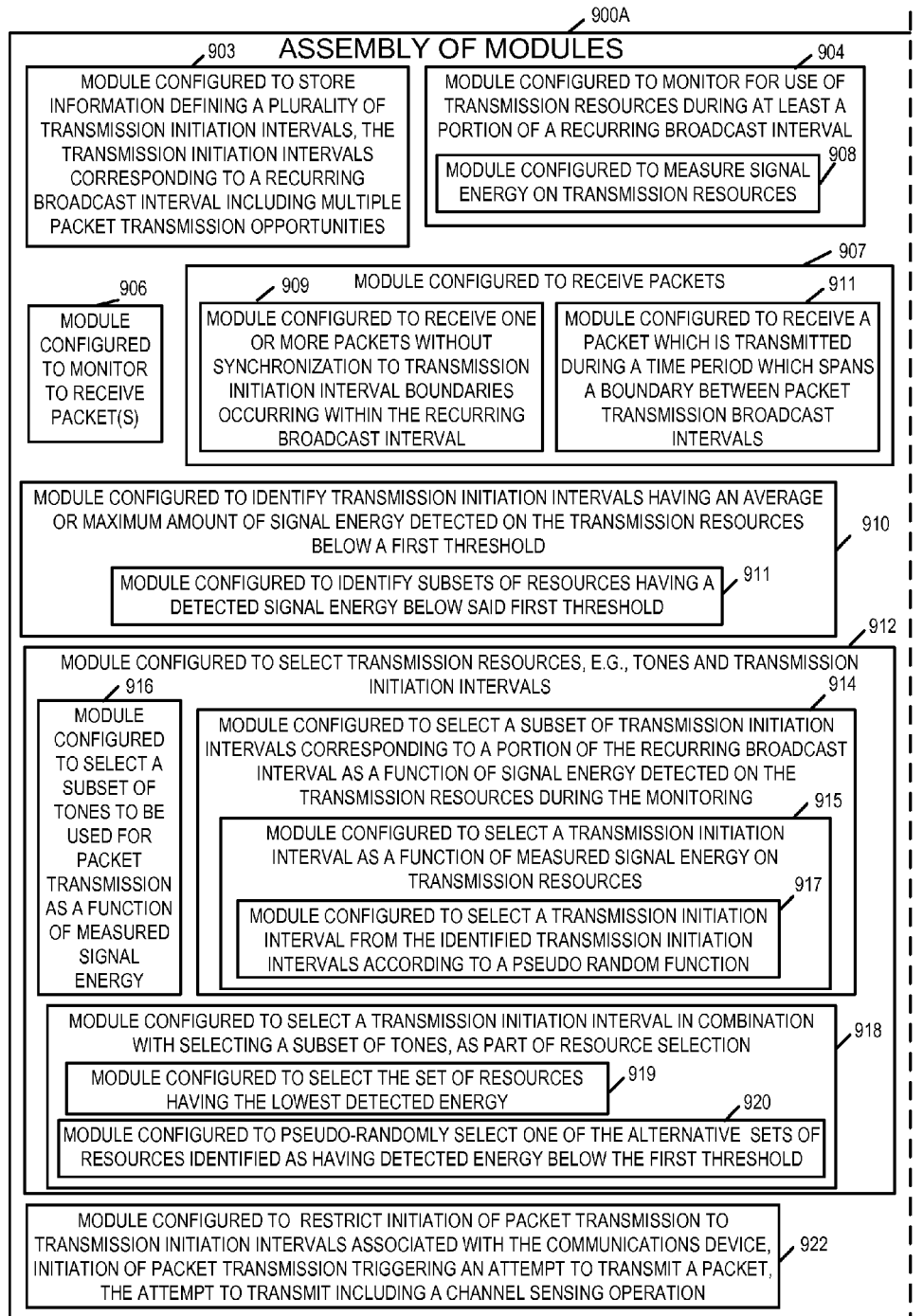
FIG. 9 illustrates an assembly of modules which may be used as the assembly of modules in the exemplary apparatus of FIG. 7.

FIG. 9 illustrates an assembly of modules 900 which may be used as the assembly of modules in the exemplary apparatus of FIG. 7. The modules in the assembly 900 can be implemented in hardware within the processor 702 of FIG. 7, e.g., as individual circuits. Alternatively, the modules may be implemented in software and stored in the memory 704 shown in FIG. 7. In some such embodiments, the assembly of modules 700 is included in routines 711 of memory 704 of device 701 of device 700 of FIG. 7. While shown in the FIG. 7 embodiment as a single processor, e.g., computer, it should be appreciated that the processor 702 may be implemented as one or more processors, e.g., computers. When implemented in software the modules include code, which when executed by the processor, configure the processor, e.g., computer, 702 to implement the function corresponding to the module. In some embodiments, processor 702 is configured to implement each of the modules of the assembly of modules 900. In embodiments where the assembly of modules 900 is stored in the memory 704, the memory 704 is a computer program product comprising a computer readable medium, e.g., a non-transitory computer readable medium, comprising code, e.g., individual code for each module, for causing at least one computer, e.g., processor 702, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 9 control and/or configure the wireless communications device 701 or elements therein such as the processor 702, to perform the functions of the corresponding steps illustrated and/or described in the method of flowchart 800 of FIG. 8.

Figure 9B:
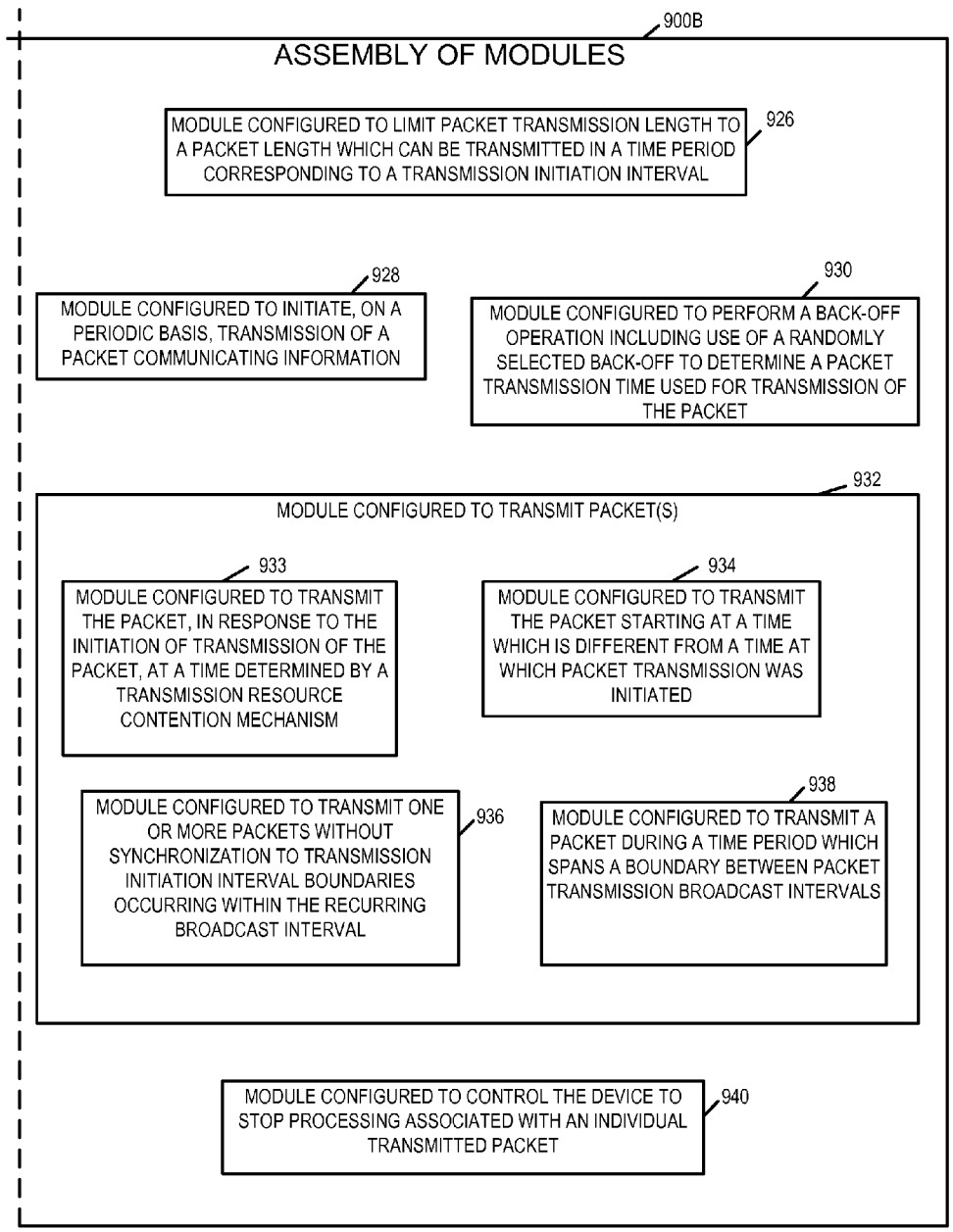

As illustrated in FIG. 9, the assembly of modules 900, comprising first part 900A illustrated by FIG. 9A and second part 900B illustrated by FIG. 9B, includes: a module 903 configured to store information defining a plurality of transmission initiation intervals, the transmission initiation intervals corresponding to a recurring broadcast interval including multiple packet transmission initiation opportunities, a module 904 configured to monitor for use of transmission resources during at least a portion of said recurring broadcast interval 204, a module 906 configured to monitor to receive packets, a module 907 configured to receive packets, and a module 910 configured to identify transmission initiation intervals having an average or maximum amount of signal energy detected on the transmission resources, during said monitoring, below a first threshold. The module 904 in various embodiments further includes a module 908 configured to measure signal energy on transmission resources. In various embodiments the module 907 further includes a module 909 configured to receive one or more packets without synchronization to transmission initiation boundaries occurring within the recurring broadcast interval, and a module 911 configured to receive a packet which is transmitted during a time period which spans a boundary between packet transmission broadcast intervals. In some embodiments, module 910 includes a module 913 configured to identify subsets of resources having detected signal energy below said first threshold.

In various embodiments the recurring broadcast interval is a recurring time period in a timing structure, e.g., time interval 204 in timing structure 200, used to control wireless transmissions, said communication device being associated with said selected subset of transmission initiation intervals for multiple sequential broadcast intervals. Thus the modules 904 and 910 perform monitoring and identifying operations discussed with regard to steps 804 and 810 respectively.

In various embodiments the assembly of modules further includes a module 912 configured to select airlink transmission resources, e.g., a transmission initiation interval and, in some embodiments, a corresponding tone subset to be used during the transmission initiation interval, corresponding to the recurring broadcast interval. In various embodiments module 912 further includes a module 914 configured to selecting a subset, e.g., one or more, of transmission initiation intervals, corresponding to a portion of said recurring broadcast interval 204, as a function of signals, e.g., based on the energy of the signals, detected on the transmission resources during the monitoring operation, and module 916 configured to select a subset of tones, e.g., OFDM tones, to be used for packet transmission as a function of measured signal energy on said transmission resources, e.g., during a selected transmission initiation interval. In some embodiments module 916 selects transmission resources on which the lowest signal energy is detected for packet transmission. In some embodiments, module 915 selects the transmission initiation interval having the lowest detected amount of signal energy on the selected subset of tones.

In some embodiments module 914 includes a module 915 configured to select a transmission initiation interval as a function of measured signal energy on transmission resources. In some embodiments, module 915 selects the transmission initiation interval having the lowest detected amount of signal energy on its resources. In some embodiments, module 915 includes a module 917 configured to select a transmission initiation interval from the identified transmission initiation intervals, e.g., identified by module 910, according to a pseudo-random function In some embodiments, module 914 receives input from one or more or all of modules 908, 910 and 916 for performing the selection.

In some embodiments, module 912 includes a module 918 configured to select a transmission initiation interval in combination with selecting a subset of tones, as part of resource selection. In some embodiments, module 918 includes a module 919 configured to select the set of resources having the lowest detected energy. In some embodiments, the resource selection operation, e.g., performed by module 919, selects the set of resources having the lowest detected energy from among a plurality of alternative sets of resources, each alternative set of resources being a non-overlapping tone subset and transmission initiation interval combination.

In various embodiments, module 918 includes a module 920 configured to pseudo randomly select one of the alternative sets of resources identified, e.g., by module 913, as having detected energy below the first threshold. In some embodiments, the resource selection operation performed by module 920 pseudo-randomly selects a set of resources having a detected energy below a predetermined threshold from among a plurality of alternative sets of resources having a detected energy below said predetermined threshold, each alternative set of resources being a non-overlapping tone subset and transmission initiation interval combination.

The assembly of modules 900 further includes a module 922 configured to restrict initiation of packet transmission to transmission initiation intervals associated with the communications device 701, initiation of packet transmission triggering an attempt to transmit a packet, said attempt to transmit including a channel sensing operation. Thus in some embodiments, module 922 controls the communications device 701 to limit the initiation of packet transmission to the selected subset of transmission initiation intervals.

The assembly of modules 900 further includes a module 926 configured to limit packet transmission length to a packet length which can be transmitted in a time period corresponding to a transmission initiation interval, e.g., IT1 210, a module 928 configured to initiate, on a periodic basis, transmission of a packet communicating information, and a module 930 configured to perform a back-off operation including use of a randomly selected back-off, e.g., back-off counter value, to determine a packet transmission time used for transmission of said packet. In various embodiments determining a packet transmission time is further based on a carrier sensing operation used in controlling a countdown process, e.g., back-off counter decrement process, used to determine expiration of the randomly selected back-off. In various embodiments the packet transmission occurs when the back-off counter value expires.

In various embodiments the assembly of modules 900 further includes module 932 configured to transmit one or more packets and a module 940 configured to control the device, e.g., device 701, to stop the processing associated with an individual transmitted packet. In various embodiments the module 932 includes module 933 configured to transmit the packet, in response to the initiation of packet transmission of the packet, at a time determined by a transmission resource contention mechanism, and a module 934 configured to transmit the packet starting at a time which is different from a time at which packet transmission was initiated. In some embodiments the module 934 controls the device 701 to transmit the packet at a time in a packet transmission initiation interval which is different from the packet transmission initiation interval in which packet transmission was initiated.

In some embodiments the module 932 configured to transmit one or more packets further includes a module 936 configured to transmit one or more packets without synchronization to transmission initiation interval boundaries occurring within the recurring broadcast interval, and a module 938 for transmitting a packet during a time period which spans a boundary between packet transmission initiation intervals.

In some embodiments, a hierarchical synchronous periodic channel structure is implemented. The resources, e.g., OFDM airlink resources, are divided into K sub-resources, e.g., a sequence of time-slots or frequency bands, and each communication device that wishes to transmit, chooses a preferred sub-resource in which the device will contend for the channel. The choice of the preferred sub-resource could be, and in some embodiments is, made by observing the occupancies in the past, and identifying resources that are least in conflict. Such resources can be identified by means of the amount of energy observed, e.g., detected, on the resource, e.g., during channel sensing operation.

Within these resources, the communications devices still contend using their existing standards such as 802.11p. Since the selection of sub-resources is made in a semi-static manner, the communications devices that transmit together are spatially spread apart in a uniform manner. In various embodiments, the concurrent channel access probability is also reduced because the communications devices wait until their sub-resource's time. This has the property of evenly spreading out the channel access times across the whole duration.

In one embodiment, an existing 802.11p based device monitors the communications channel and observes other transmissions in an initial setup time. In this time, the device identifies a sub-time slot which can be used by the device for transmission. In one embodiment such a sub-time-slot is one that it found to be the least occupied. Whenever the device receives a packet to broadcast, it waits until its preferred time slot arrives. In the slot, it uses 802.11p based channel access mechanism and obtains access to the channel.

Various methods and apparatus described in this application are well suited for use in wireless communications devices and networks supporting peer to peer signaling. In various embodiments a device of any of one or more of Figures includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the wireless communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile wireless communications devices, e.g., mobile nodes such as mobile terminals, stationary wireless communications devices such as access points such as base stations, network nodes and/or communications systems. Various embodiments are also directed to methods, e.g., method of controlling and/or operating wireless communications devices such as mobile nodes and/or stationary nodes, access points such as base stations network nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal reception, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless communications device supporting peer to peer signaling, including a processor configured to implement one, multiple or all of the steps of one or more methods of the invention.

In some embodiments, the processor or processors, e.g., CPUs, of one or more devices, e.g., communications nodes such as wireless terminals, access nodes, and/or network nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a communications device to transmit packets, the method comprising:
storing information defining a plurality of transmission initiation intervals, said transmission initiation intervals corresponding to a recurring broadcast interval including multiple packet transmission opportunities;
monitoring for use of transmission resources during at least a portion of said recurring broadcast interval;
selecting a subset of transmission initiation intervals corresponding to a portion of said recurring broadcast interval as a function of signals detected on said transmission resources during said monitoring; and
restricting initiation of packet transmission to transmission initiation intervals associated with said communications device, initiation of packet transmission triggering an attempt to transmit a packet, said attempt to transmit including a channel sensing operation.

2. The method of claim 1, wherein said recurring broadcast interval is a recurring time period in a timing structure used to control wireless transmissions, said communication device being associated with said selected subset of transmission initiation intervals for multiple sequential broadcast intervals.

3. The method of claim 1, further comprising:
identifying transmission initiation intervals having an average or maximum amount of signal energy detected on said transmission resources, during said monitoring, below a first threshold; and
wherein selecting a transmission initiation interval includes selecting, according to a pseudo random function, a transmission initiation interval from the identified transmission initiation intervals.

4. The method of claim 1, wherein selecting a subset of transmission initiation intervals includes selecting one of K transmission initiation intervals, where K is an integer greater than 2, said subset including less than K selected transmission initiation intervals.

5. The method of claim 1, wherein each transmission initiation interval has a duration which is a fraction of a maximum permitted continuous transmission time period which can be used to transmit a packet.

6. The method of claim 1, further comprising:
limiting packet transmission length to a packet length which can be transmitted in a time period corresponding to a transmission initiation interval.

7. The method of claim 1, wherein monitoring for use of transmission resources includes measuring signal energy, and wherein the method further comprises:
selecting a subset of tones to be used for packet transmission as a function of the measured signal energy on said transmission resources; and
wherein selecting a subset of transmission initiation intervals includes selecting a transmission initiation interval as a function of measured signal energy on said transmission resources.

8. The method of claim 1, further comprising:
initiating, on a periodic basis, transmission of a packet communicating information; and
transmitting said packet, in response to said initiation of transmission of the packet, at a time determined by a transmission resource contention mechanism.

9. The method of claim 8, further comprising:
following initiation of a packet transmission, performing a back-off operation including use of a randomly selected back-off to determine a packet transmission time used for transmission of said packet.

10. The method of claim 9, wherein determining a packet transmission time is further based on a carrier sensing operation used in controlling a countdown process used to determine expiration of the randomly selected back-off.

11. A communications device comprising:
means for storing information defining a plurality of transmission initiation intervals, said transmission initiation intervals corresponding to a recurring broadcast interval including multiple packet transmission opportunities;
means for monitoring for use of transmission resources during at least a portion of said recurring broadcast interval;
means for selecting a subset of transmission initiation intervals corresponding to a portion of said recurring broadcast interval as a function of signals detected on said transmission resources during said monitoring; and
means for restricting initiation of packet transmission to transmission initiation intervals associated with said communications device, initiation of packet transmission triggering an attempt to transmit a packet, said attempt to transmit including a channel sensing operation.

12. The communications device of claim 11, further comprising:
means for identifying transmission initiation intervals having an average or maximum amount of signal energy detected on said transmission resources, during said monitoring, below a first threshold; and wherein said means for selecting a subset transmission initiation interval include means for selecting, according to a pseudo random function, a transmission initiation interval from the identified transmission initiation intervals.

13. The communications device of claim 11, further comprising:
means for limiting packet transmission length to a packet length which can be transmitted in a time period corresponding to a transmission initiation interval.

14. The communications device of claim 11, wherein said means for monitoring for use of transmission resources include means for measuring signal energy, and wherein the communications device further comprises:
means for selecting a subset of tones to be used for packet transmission as a function of the measured signal energy on said transmission resources; and
wherein said means for selecting a subset of transmission initiation intervals include means for selecting a transmission initiation interval as a function of measured signal energy on said transmission resources.

15. The communications device of claim 11, further comprising:
- means for initiating, on a periodic basis, transmission of a packet communicating information; and
- means for transmitting said packet, in response to said initiation of transmission of the packet, at a time determined by a transmission resource contention mechanism.

16. A communications device comprising:
at least one processor configured to:
- store information defining a plurality of transmission initiation intervals, said transmission initiation intervals corresponding to a recurring broadcast interval including multiple packet transmission opportunities;
- monitor for use of transmission resources during at least a portion of said recurring broadcast interval;
- select a subset of transmission initiation intervals corresponding to a portion of said recurring broadcast interval as a function of signals detected on said transmission resources during said monitoring; and
- restrict initiation of packet transmission to transmission initiation intervals associated with said communications device, initiation of packet transmission triggering an attempt to transmit a packet, said attempt to transmit including a channel sensing operation; and memory coupled to said at least one processor.

17. The communications device of claim 16, wherein said at least one processor is further configured to identify transmission initiation intervals having an average or maximum amount of signal energy detected on said transmission resources, during said monitoring, below a first threshold; and
wherein said at least one processor is further configured to, as part of being configured to select a subset of transmission initiation intervals, select a transmission initiation interval from the identified transmission initiation intervals according to a pseudo random function.

18. The communications device of claim 16, wherein said at least one processor is further configured to, as part of being configured to select a subset of transmission initiation intervals, select one of K transmission initiation intervals, where K is an integer greater than 2, said subset including less than K selected transmission initiation intervals.

19. The communications device of claim 16, wherein said at least one processor is further configured to, as part of being configured to monitor for use of transmission resources, measure signal energy; and
wherein said at least one processor is further configured to:
- select a subset of tones to be used for packet transmission as a function of the measured signal energy on said transmission resources; and
- select, as part of being configured to select a subset of transmission initiation intervals, a transmission initiation interval as a function of the measured signal energy on said transmission resources.

20. A computer program product for use in a communications device, the computer program product comprising:
a non-transitory computer readable medium comprising:
- code for causing at least one computer to store information defining a plurality of transmission initiation intervals, said transmission initiation intervals corresponding to a recurring broadcast interval including multiple packet transmission opportunities;
- code for causing said at least one computer to monitor for use of transmission resources during at least a portion of said recurring broadcast interval;
- code for causing said at least one computer to select a subset of transmission initiation intervals corresponding to a portion of said recurring broadcast interval as a function of signals detected on said transmission resources during said monitoring; and
- code for causing said at least one computer to restrict initiation of packet transmission to transmission initiation intervals associated with said communications device, initiation of packet transmission triggering an attempt to transmit a packet, said attempt to transmit including a channel sensing operation.

* * * * *